United States Patent
Falkenberg et al.

(10) Patent No.: US 10,528,004 B2
(45) Date of Patent: Jan. 7, 2020

(54) METHODS AND APPARATUS FOR FULL PARALLAX LIGHT FIELD DISPLAY SYSTEMS

(71) Applicant: Ostendo Technologies, Inc., Carlsbad, CA (US)

(72) Inventors: Andreas Falkenberg, Escondido, CA (US); Danillo Bracco Graziosi, Carlsbad, CA (US); Hussein S. El-Ghoroury, Carlsbad, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 0 days.

(21) Appl. No.: 16/413,415

(22) Filed: May 15, 2019

(65) Prior Publication Data

US 2019/0265646 A1  Aug. 29, 2019

Related U.S. Application Data

(63) Continuation of application No. 15/243,629, filed on Aug. 22, 2016, now Pat. No. 10,310,450, which is a
(Continued)

(51) Int. Cl.
*G03H 1/26* (2006.01)
*H04N 19/60* (2014.01)
(Continued)

(52) U.S. Cl.
CPC ............ *G03H 1/268* (2013.01); *G02B 27/225* (2013.01); *G03H 1/0443* (2013.01);
(Continued)

(58) Field of Classification Search
CPC ........ G03H 1/268; H04N 19/60; H04N 19/439
(Continued)

(56) References Cited

U.S. PATENT DOCUMENTS

| 5,613,048 A | 3/1997 | Chen et al. |
| 6,009,188 A | 12/1999 | Cohen et al. |

(Continued)

FOREIGN PATENT DOCUMENTS

| CN | 101430426 | 5/2009 |
| CN | 104081414 | 10/2014 |

(Continued)

OTHER PUBLICATIONS

"3-D Display Technologies—New Trends of Space Expression", CMC Publishing Co., Ltd., Toshio Honda, Supervising Editor, Dec. 4, 2013, pp. 80-84.
(Continued)

*Primary Examiner* — Jeffery A Williams
(74) *Attorney, Agent, or Firm* — Womble Bond Dickinson (US) LLP

(57) ABSTRACT

A 3D video processing system with integrated display is described wherein the huge data bandwidth demands on the source-to-display transmission medium is decreased by utilizing innovative 3D light field video data compression at the source along with innovative reconstruction of 3D light field video content from highly compressed 3D video data at the display. The display incorporates parallel processing pipelines integrated with a Quantum Photonics Imager® for efficient data handling and light imaging.

28 Claims, 12 Drawing Sheets

Related U.S. Application Data continuation of application No. PCT/US2016/028709, filed on Apr. 21, 2016.

(60) Provisional application No. 62/151,656, filed on Apr. 23, 2015.

(51) Int. Cl.

| | |
|---|---|
| *H04N 19/43* | (2014.01) |
| *H04N 13/128* | (2018.01) |
| *G03H 1/08* | (2006.01) |
| *G02B 27/22* | (2018.01) |
| *H04N 19/42* | (2014.01) |
| *H04N 13/122* | (2018.01) |
| *H04N 19/124* | (2014.01) |
| *H04N 19/147* | (2014.01) |
| *H04N 19/597* | (2014.01) |
| *G03H 1/04* | (2006.01) |
| *H04N 13/189* | (2018.01) |
| *H04N 13/15* | (2018.01) |
| *H04N 13/161* | (2018.01) |
| *H04N 13/178* | (2018.01) |
| *H04N 19/436* | (2014.01) |

(52) U.S. Cl.
CPC .......... *G03H 1/0808* (2013.01); *H04N 13/122* (2018.05); *H04N 13/128* (2018.05); *H04N 13/15* (2018.05); *H04N 13/161* (2018.05); *H04N 13/178* (2018.05); *H04N 13/189* (2018.05); *H04N 19/124* (2014.11); *H04N 19/147* (2014.11); *H04N 19/439* (2014.11); *H04N 19/597* (2014.11); *H04N 19/60* (2014.11); *H04N 19/436* (2014.11)

(58) Field of Classification Search
USPC .......................................................... 348/40
See application file for complete search history.

(56) References Cited

U.S. PATENT DOCUMENTS

| | | |
|---|---|---|
| 6,091,767 A | 7/2000 | Westerman |
| 6,097,394 A | 8/2000 | Levoy et al. |
| 6,252,989 B1 | 6/2001 | Geisler et al. |
| 6,549,308 B1 | 4/2003 | Camahort |
| 6,738,533 B1 | 5/2004 | Shum et al. |
| 6,963,431 B2 | 11/2005 | Holzbach et al. |
| 7,404,645 B2 | 7/2008 | Margulis |
| 7,623,560 B2 | 11/2009 | El-Ghoroury et al. |
| 7,767,479 B2 | 8/2010 | El-Ghoroury et al. |
| 7,829,902 B2 | 11/2010 | El-Ghoroury et al. |
| 7,978,407 B1 | 7/2011 | Connor |
| 8,049,231 B2 | 11/2011 | El-Ghoroury et al. |
| 8,098,265 B2 | 1/2012 | El-Ghoroury et al. |
| 8,155,456 B2 | 4/2012 | Babacan et al. |
| 8,243,770 B2 | 8/2012 | El-Ghoroury et al. |
| 8,284,237 B2 | 10/2012 | Chen et al. |
| 8,315,476 B1 | 11/2012 | Georgiev et al. |
| 8,401,316 B2 | 3/2013 | Babacan et al. |
| 8,567,960 B2 | 10/2013 | El-Ghoroury et al. |
| 8,681,185 B2 | 3/2014 | Guncer |
| 8,854,724 B2 | 10/2014 | El-Ghoroury et al. |
| 8,913,004 B1 | 12/2014 | Bozarth et al. |
| 8,928,969 B2 | 1/2015 | Alpaslan et al. |
| 8,970,646 B2 | 3/2015 | Guncer |
| 9,097,890 B2 | 8/2015 | Miller et al. |
| 9,110,504 B2 | 8/2015 | Lewis et al. |
| 9,129,183 B2 | 9/2015 | Venkataraman et al. |
| 9,179,126 B2 | 11/2015 | El-Ghoroury et al. |
| 9,195,053 B2 | 11/2015 | El-Ghoroury et al. |
| 9,274,608 B2 | 3/2016 | Katz et al. |
| 9,524,682 B2 | 12/2016 | El-Ghoroury et al. |
| 9,529,191 B2 | 12/2016 | Sverdrup et al. |
| 9,538,182 B2 | 1/2017 | Mishourovsky et al. |
| 9,681,069 B2 | 6/2017 | El-Ghoroury et al. |
| 9,712,764 B2 | 7/2017 | El-Ghoroury et al. |
| 9,769,365 B1 | 9/2017 | Jannard |
| 9,774,800 B2 | 9/2017 | El-Ghoroury et al. |
| 9,779,515 B2 | 10/2017 | El-Ghoroury et al. |
| 9,965,982 B2 | 5/2018 | Lapstun |
| 2002/0067521 A1 | 6/2002 | Holzbach et al. |
| 2005/0018911 A1 | 1/2005 | Deever |
| 2007/0035706 A1 | 2/2007 | Margulis |
| 2007/0229653 A1 | 10/2007 | Matusik et al. |
| 2008/0043095 A1 | 2/2008 | Vetro et al. |
| 2008/0043096 A1 | 2/2008 | Vetro et al. |
| 2008/0187305 A1 | 8/2008 | Raskar et al. |
| 2009/0086170 A1 | 4/2009 | El-Ghoroury et al. |
| 2009/0268970 A1 | 10/2009 | Babacan et al. |
| 2009/0278998 A1 | 11/2009 | El-Ghoroury et al. |
| 2010/0003777 A1 | 1/2010 | El-Ghoroury et al. |
| 2010/0007804 A1 | 1/2010 | Guncer |
| 2010/0046848 A1 | 2/2010 | Witzgall |
| 2010/0056274 A1 | 3/2010 | Uusitalo et al. |
| 2010/0066921 A1 | 3/2010 | El-Ghoroury et al. |
| 2010/0091050 A1 | 4/2010 | El-Ghoroury et al. |
| 2010/0156894 A1 | 6/2010 | Holler et al. |
| 2010/0220042 A1 | 9/2010 | El-Ghoroury et al. |
| 2010/0225679 A1 | 9/2010 | Guncer |
| 2010/0231585 A1 | 9/2010 | Weiblen |
| 2010/0265385 A1 | 10/2010 | Knight et al. |
| 2010/0309287 A1 | 12/2010 | Rodriguez |
| 2011/0058021 A1 | 3/2011 | Chen et al. |
| 2011/0134227 A1 | 6/2011 | Shin |
| 2011/0255592 A1 | 10/2011 | Sung et al. |
| 2011/0261050 A1 | 10/2011 | Smolic et al. |
| 2012/0033113 A1 | 2/2012 | El-Ghoroury et al. |
| 2012/0050481 A1 | 3/2012 | Chen et al. |
| 2012/0069154 A1 | 3/2012 | Talstra et al. |
| 2012/0105310 A1 | 5/2012 | Sverdrup et al. |
| 2012/0183232 A1 | 7/2012 | Babacan et al. |
| 2012/0213270 A1 | 8/2012 | Baraniuk et al. |
| 2012/0280996 A1* | 11/2012 | Kannan .................. G06T 15/20 345/426 |
| 2012/0309455 A1 | 12/2012 | Klose et al. |
| 2012/0327139 A1 | 12/2012 | Margulis |
| 2013/0010057 A1 | 1/2013 | Borel et al. |
| 2013/0050786 A1 | 2/2013 | Lucente |
| 2013/0077880 A1 | 3/2013 | Venkataraman et al. |
| 2013/0077882 A1 | 3/2013 | Venkataraman et al. |
| 2013/0141895 A1 | 6/2013 | Alpaslan et al. |
| 2013/0222633 A1 | 8/2013 | Knight et al. |
| 2013/0242051 A1 | 9/2013 | Balogh |
| 2013/0258451 A1 | 10/2013 | El-Ghoroury et al. |
| 2013/0282639 A1 | 10/2013 | Potkonjak |
| 2013/0286053 A1 | 10/2013 | Fleck et al. |
| 2013/0286178 A1 | 10/2013 | Lewis et al. |
| 2013/0321581 A1 | 12/2013 | El-Ghoroury et al. |
| 2013/0342644 A1 | 12/2013 | Rusanovskyy et al. |
| 2014/0002675 A1 | 1/2014 | Duparre et al. |
| 2014/0079336 A1 | 3/2014 | Venkataraman et al. |
| 2014/0092281 A1 | 4/2014 | Nisenzon et al. |
| 2014/0098189 A1 | 4/2014 | Deng et al. |
| 2014/0146201 A1 | 5/2014 | Knight et al. |
| 2014/0168062 A1 | 6/2014 | Katz et al. |
| 2014/0210823 A1 | 7/2014 | Maguire, Jr. |
| 2014/0219558 A1 | 8/2014 | Teng et al. |
| 2014/0232822 A1 | 8/2014 | Venkataraman et al. |
| 2014/0267228 A1 | 9/2014 | Ofek et al. |
| 2014/0285429 A1 | 9/2014 | Simmons |
| 2014/0292620 A1 | 10/2014 | Lapstun |
| 2014/0340434 A1 | 11/2014 | El-Ghoroury et al. |
| 2014/0347361 A1 | 11/2014 | Alpaslan et al. |
| 2014/0375856 A1 | 12/2014 | Kaneko |
| 2015/0033539 A1 | 2/2015 | El-Ghoroury et al. |
| 2015/0178939 A1 | 6/2015 | Bradski et al. |
| 2015/0201176 A1 | 7/2015 | Graziosi et al. |
| 2015/0264223 A1 | 9/2015 | Akenine-Moller et al. |
| 2015/0296203 A1 | 10/2015 | Lucente et al. |
| 2015/0312560 A1 | 10/2015 | Deering et al. |
| 2016/0021355 A1 | 1/2016 | Alpaslan et al. |

(56) References Cited

U.S. PATENT DOCUMENTS

| | | |
|---|---|---|
| 2016/0028935 A1 | 1/2016 | El-Ghoroury et al. |
| 2016/0182782 A1 | 6/2016 | El-Ghoroury et al. |
| 2016/0191765 A1 | 6/2016 | El-Ghoroury et al. |
| 2016/0191823 A1 | 6/2016 | El-Ghoroury et al. |
| 2016/0360177 A1 | 12/2016 | Graziosi et al. |
| 2017/0142427 A1 | 5/2017 | Graziosi et al. |
| 2017/0184776 A1 | 6/2017 | El-Ghoroury et al. |
| 2017/0236295 A1 | 8/2017 | El-Ghoroury |
| 2017/0264879 A1 | 9/2017 | Zhou |

FOREIGN PATENT DOCUMENTS

| | | |
|---|---|---|
| CN | 104216128 | 12/2014 |
| EP | 1978754 | 10/2008 |
| WO | WO-2010/108024 | 9/2010 |
| WO | WO-2011/065738 | 6/2011 |
| WO | WO-2013/049699 | 4/2013 |
| WO | WO-2015/106031 | 7/2015 |

OTHER PUBLICATIONS

"International Search Report and Written Opinion of the International Searching Authority dated Jul. 29, 2016; International Application No. PCT/US2016/028709", Jul. 26, 2016.

"Office Action dated Mar. 26, 2019; Chinese Patent Application No. 201680023394.X", Mar. 26, 2019.

"Office Action dated Sep. 19, 2018; Chinese Patent Application No. 201680023394.X", Sep. 19, 2018.

Aggoun, Amar et al., "Immersive 3D Holoscopic Video System", IEEE Multimedia Magazine, Special Issue on 3D Imaging Techniques and Multimedia Applications, vol. 20, No. 1, Jan.-Mar. 2013, pp. 28-37.

Akeley, Kurt et al., "A Stereo Display Prototype with Multiple Focal Distances", ACM Trans. Graph. (SIGGRAPH), vol. 23, 2004, pp. 804-813.

Alpaslan, Zahir Y. et al., "Development and Deployment of a Tiled Full Parallax Light Field Display System", Proceedings of the SPIE, Applications of Digital Image Processing XXXIX, vol. 9971, Sep. 27, 2016, pp. 99710J-1 to 99710J-8.

Alpaslan, Zahir Y. et al., "Parametric Characterization of Perceived Light Field Display Resolution", SID Symposium Digest of Technical Papers, vol. 47, No. 1, May 2016, pp. 1241-1245.

Alpaslan, Zahir Y. et al., "Small Form Factor Full Parallax Tiled Light Field Display", Proceedings of Electronic Imaging, SPIE-IS &T, vol. 9391, Feb. 9, 2015, pp. 93910E-1 to 93910E-10.

Arai, Jun et al., "Integral Three-Dimensional Television Using a 33-Megapixel Imaging System", Journal of Display Technology, vol. 6, No. 10, Oct. 2010, pp. 422-430.

Arai, Jun , "Three-Dimensional Television System Based on Spatial Imaging Method Using Integral Photography", International Conference on Acoustics, Speech, and Signal Processing (ICASSP) 2012, May 7-9, 2012, pp. 5449-5452.

Balogh, Tibor et al., "Real-time 3D light field transmission", SPIE Photonics Europe, vol. 7724, Apr. 16, 2010, pp. 772406-1 to 772406-7.

Balogh, Tibor , "The HoloVizio System", Stereoscopic Displays and Virtual Reality Systems XIII, Proceedings of the SPIE-IS&T Electronic Imaging, vol. 6011, Jan. 27, 2006, pp. 60550U-1 to 60550U-12.

Bhaskaran, Vasudev , "65.1: Invited Paper: Image/Video Compression—A Display Centric Viewpoint", SID Symposium Digest of Technical Papers, vol. 38, No. 1, 2008, pp. 990-993.

Cakmakci, Ozan et al., "Head-Worn Displays: A Review", Journal of Display Technology, vol. 2, No. 3, Sep. 2006, pp. 199-216.

Candes, Emmanuel et al., "Near Optimal Signal Recovery From Random Projections: Universal Encoding Strategies?", 2004, pp. 1-39.

Candes, Emmanuel J. et al., "Robust Uncertainty Principles: Exact Signal Reconstruction From Highly Incomplete Frequency Information", IEEE Transactions on Information Theory, vol. 52, No. 2, Feb. 2006, pp. 489-509.

Chai, Jin-Xiang et al., "Plenoptic Sampling", Proceedings of the 27th Annual Conference on Computer Graphics and Interactive Techniques—SIGGRAPH '00, 2000, pp. 307-318.

Chen, Jianhong et al., "True Color Optical Simulation of Integral Imaging 3D Display", Proceedings of the International Display Workshops, vol. 21, Dec. 3, 2014, pp. 848-851.

Chen, Wei et al., "New Requirements of Subjective Video Quality Assessment Methodologies for 3DTV", Video Processing and Quality Metrics 2010 (VPQM), Scottsdale, United States, 2010, 6 pp. total.

Conti, Caroline et al., "Spatial Prediction Based on Self-Similarity Compensation for 3D Holoscopic Image and Video Coding", 2011 18th IEEE International Conference on Image Processing (ICIP), Sep. 11-14, 2011, pp. 961-964.

Curless, Brian et al., "A Volumetric Method for Building Complex Models from Range Images", Proceedings of the 23rd Annual Conference on Computer Graphics and Interactive Techniques, 1996, pp. 1-10.

Donoho, David L. , "Compressed Sensing", IEEE Transactions on Information Theory, vol. 52, No. 4, Apr. 2006, pp. 1289-1306.

El-Ghoroury, Hussein S. et al., "Quantum Photonic Imager (QPI): A New Display Technology and Its Applications", Proceedings of the International Display Workshops, vol. 21, Dec. 3, 2014, pp. 1202-1205.

El-Ghoroury, Hussein S. et al., "Quantum Photonic Imager (QPI): A Novel Display Technology that Enables more than 3D Applications", SID Symposium Digest of Technical Papers, vol. 46, No. 1, May 2015, pp. 371-374.

Fehn, Christoph , "A 3D-TV Approach Using Depth-Image-Based Rendering (DIBR)", Proceedings of Picture Coding Symposium, San Francisco, CA, USA, Dec. 2004, 6 pp. total.

Fehn, Christoph , "Depth-Image-Based Rendering (DIBR), Compression and Transmission for a New Approach on 3D-TV", Proc. of SPIE Stereoscopic Displays and Virtual Reality Systems XI, 2004, pp. 93-104.

Forman, Matthew C. et al., "Objective Quality Measurement of Integral 3D Images", Proc. SPIE 4660, Stereoscopic Displays and Virtual Reality Systems IX, 155, 2002, 8 pp. total.

Furihata, Hisayoshi et al., "Novel view synthesis with residual error feedback for FTV", Stereoscopic Displays and Applications XXI, Proceedings of the SPIE-IS&T Electronic Imaging, vol. 7542, Jan. 2010, pp. 75240K-1 to 75240K-12.

Gilliam, Christopher et al., "Adaptive Plenoptic Sampling", 2011 18th IEEE International Conference on Image Processing, 2011, pp. 2581-2584.

Gortler, Steven J. et al., "The Lumigraph", Proceedings of the 23rd Annual Conference on Computer Graphics and Interactive Techniques (SIGGRAPH '96), 1996, pp. 43-52.

Graziosi, Danillo B. et al., "Compression for Full-Parallax Light Field Displays", Proceedings of SPIE—The International Society for Optical Engineering, Feb. 2014, 14 pp. total.

Graziosi, Danillo B. et al., "Compression for Full-Parallax Light Field Displays", Stereoscopic Displays and Applications XXV, Proc. of SPIE-IS&T Electronic Imaging, vol. 9011, Mar. 6, 2014, pp. 90111A-1 to 90111A-14.

Graziosi, Danillo B. et al., "Depth assisted compression of full parallax light fields", Stereoscopic Displays and Applications XXVI, Proceedings of SPIE-IS&T Electronic Imaging, vol. 9391, Mar. 17, 2015, pp. 93910Y-1 to 93910Y-15.

Guenter, Brian et al., "Foveated 3D Graphics", ACM SIGGRAPH Asia, Nov. 2012, 10 pp. total.

Halle, Michael W. et al., "Fast computer graphics rendering for full parallax spatial displays", Proc. SPIE 3011, Practical Holography XI and Holographic Materials III, Apr. 10, 1997, 8 pp. total.

Halle, Michael W. , "Multiple Viewpoint Rendering for Three-Dimensional Displays", PhD Thesis, Program in Media Arts and Sciences, School of Architecture and Planning, Massachusetts Institute of Technology, 1997, 164 pp. total.

(56) References Cited

OTHER PUBLICATIONS

Heide, Felix et al., "Adaptive Image Synthesis for Compressive Displays", Proc. of SIGGRAPH 2013 (ACM Transactions on Graphics), vol. 32, No. 4, 2013, 11 pp. total.
Hoffman, David M. et al., "Vergence-accommodation conflicts hinder visual performance and cause visual fatigue", Journal of Vision, vol. 8, No. 3, 2008, pp. 1-30.
Holliman, Nicolas S. et al., "Three-Dimensional Displays: A Review and Applications Analysis", IEEE Transactions on Broadcasting, vol. 57, No. 2, Jun. 2011, pp. 362-371.
Hoshino, H. et al., "Analysis of resolution limitation of integral photography", J. Opt. Soc. Am. A, vol. 15, No. 8, Aug. 1998, pp. 2059-2065.
Hu, Xinda et al., "Design and Assessment of a Depth-Fused Multi-Focal-Plane Display Prototype", Journal of Display Technology, vol. 10, No. 4, Apr. 2014, pp. 308-316.
Hua, Hong et al., "A 3D integral imaging optical see-through head-mounted display", Optics Express, vol. 22, No. 11, May 28, 2014, pp. 13484-13491.
Huang, Fu-Chung et al., "The Light Field Stereoscope: Immersive Computer Graphics via Factored Near-Eye Light Field Displays with Focus Cues", ACM Transactions on Graphics, vol. 34, No. 4, Article 60, Aug. 2015, pp. 60:1 to 60:12.
International Organisation for, Standardisation , "Call for Proposals on 3D Video Coding Technology", ISO/IEC JTC1/SC29/WG11, MPEG2011/N12036, Geneva, Switzerland, Mar. 2011, 20 pp. total.
International Organisation for, Standardisation , "Use Cases and Requirements on Free-viewpoint Television (FTV)", ISO/IEC JTC1/SC29/WG11, MPEG2013/N14104, Geneva, Switzerland, Oct. 2013, 12 pp. total.
International Telecommunication, Union , "H.264, Series H: Audiovisual and MultiMedia Systems, Infrastructure of audiovisual services—Coding of moving video, Advanced video coding for generic audiovisual services", ISO/IEC 14496-10:2003, Coding of Audiovisual Objects—Part 10: Advanced Video Coding, ITU-T Recommendation H.264, Mar. 2005, 343 pp. total.
Isaksen, Aaron et al., "Dynamically Reparameterized Light Fields", Proceedings of the 27th Annual Conference on Computer Graphics and Interactive Techniques (SIGGRAPH '00), 2000, pp. 297-306.
Iwadate, Yuichi et al., "Generating Integral Image from 3D Object by Using Oblique Projection", 18th International Display Workshops 2011 (IDS '11), Dec. 7-9, 2011, pp. 269-272.
Iwasawa, Shoichiro et al., "REI: an automultiscopic projection display", Proceedings of 3DSA2013, Selected paper 1, 2013, pp. 1-4.
Jang, Jae-Young et al., "3D Image Correlator using Computational Integral Imaging Reconstruction Based on Modified Convolution Property of Periodic Functions", Journal of the Optical Society of Korea, vol. 18, No. 4, Aug. 2014, pp. 388-394.
Javidi, Bahram et al., "Three-Dimensional Holographic Image Sensing and Integral Imaging Display", Journal of Display Technology, vol. 1, No. 2, Dec. 2005, pp. 341-346.
Kim, Changil , "Scene Reconstruction from a Light Field", https://graphics.ethz.ch/~kimc/publications/changil-kim-ms-thesis-2010-compressed.pdf, 2010, 72 pp. total.
Koike, T. , "Theory, Design, and Application of 4-D Light Field Display", Ph.D. Dissertation, University of Tokyo, Mar. 23, 2009, 133 pp. total.
Kovacs, Peter T. et al., "Overview of the Applicability of H.264/MVC for Real-Time Light-Field Applications", 2014 3DTV-Conference: The True Vision—Capture, Transmission and Display of 3D Video (3DTV-CON), IEEE, Jul. 2, 2014, 4 pp. total.
Kundu, Shinjini , "Light Field Compression Using Homography and 2D Warping", 2012 IEEE International Conference on Acoustics, Speech and Signal Processing (ICASSP), Mar. 25-30, 2012, pp. 1349-1352.
Lanman, Douglas et al., "Near-Eye Light Field Displays", ACM Transactions on Graphics (TOC), vol. 32, Issue 6, Article 220, Nov. 2013, 27 pp. total.

Lee, Cheon et al., "View Synthesis using Depth Map for 3D Video", Proceedings of 2009 APSIPA Annual Summit and conference, Sapporo, Japan, 2009, pp. 350-357.
Levoy, Marc et al., "Light Field Rendering", Computer Graphics, SIGGRAPH 96 Proceedings, 1996, pp. 31-42.
Lippmann, M. G. , "Epreuves reversibles. Photographies integrales.", Comptes-Rendus Academie des Sciences, vol. 146, 1908, pp. 446-451.
Liu, Shujie et al., "New Depth Coding Techniques With Utilization of Corresponding Video", IEEE Transactions on Broadcasting, vol. 57, No. 2, Jun. 2011, pp. 551-561.
Lucente, M. , "Computational holograhic bandwidth compression", IBM Systems Journal, vol. 35, Nos. 3&4, 1996, pp. 349-365.
Lucente, Mark , "Diffraction-Specific Fringe Computation for Electro-Holography", Doctoral Thesis Dissertation, MIT Dept. of Electrical Engineering and Computer Science, Sep. 1994, 171 pp. total.
Lucente, Mark , "Holographic bandwidth compression using spatial subsampling", Optical Engineering, Special Section on Electronic Holography, Jun. 1996, pp. 1-25.
Lucente, Mark , "Interactive Computation of Holograms Using a Look-up Table", Journal of Electronic Imaging, vol. 2, No. 1, pp. 28-34, Jan. 1993, 14 pp. total.
Lucente, Mark , "Interactive holographic displays: The first 10 years", Book chapter for "Holography—The First 50 Years", Draft: 2003, 2003, 17 pp. total.
Lucente, Mark , "Interactive three-dimensional holographic displays: seeing the future in depth", for special issue of SIGGRAPH's Computer Graphics publication on Current, New, and Emerging Display Systems, May 1997, 17 pp. total.
Magnor, Marcus et al., "Data Compression for Light-Field Rendering", IEEE Transactions on Circuits and Systems for Video Technology, vol. 10, No. 3, Apr. 2000, pp. 338-343.
Maimone, Andrew et al., "Computational Augmented Reality Eyeglasses", 2013 IEEE International Symposium on Mixed and Augmented Reality (ISMAR), Oct. 1-4, 2013, pp. 29-38.
Maimone, Andrew et al., "Focus 3D: Compressive Accommodation Display", ACM Transactions on Graphics, vol. 32. No. 5, 2013, 13 pp. total.
Malvar, Henrique S. et al., "Lifting-based reversible color transformations for image compression", Proc. of SPIE of Applications of Digital Image Processing, vol. 7073, 2008, pp. 707301-1 to 707301-10.
Marwah, Kshitij et al., "Compressive Light Field Photography using Overcomplete Dictionaries and Optimized Projections", Proc. of SIGGRAPH 2013 (ACM Transactions on Graphics, 32, 4), 2013, 12 pp. total.
Masia, Belen et al., "A survey on computational displays: Pushing the boundaries of optics, computation, and perception", Computers & Graphics, vol. 37, 2013, pp. 1012-1038.
Masia, Belen et al., "Display Adaptive 3D Content Remapping", Computers and Graphics, vol. 37, No. 8, Dec. 1, 2013, pp. 983-996.
Matsubara, Rie et al., "Light field display simulation for light field quality assessment", Proceedings of the Stereoscopic Displays and Applications Conference XXVI (SPIE-IS&T), vol. 9391, Feb. 9-11, 2015, pp. 93910G-1 to 93910G-15.
Microsoft, "Microsoft HoloLens", downloaded from https://www.microsoft.com/en-us/hololens, admitted prior art, 5 pp. total.
Mori, Yuji et al., "View generation with 3D warping using depth information for FTV", Signal Processing: Image Communication, vol. 24, 2009, pp. 65-72.
Morvan, Yannick et al., "Platelet-based coding of depth maps for the transmission of multiview images", Proceedings of the SPIE, Stereoscopic Displays and Applications, vol. 6055, Feb. 2006, 12 pp. total.
Ng, Ren, "Fourier Slice Photography", ACM Trans. Graph., vol. 24, No. 3, Jul. 2005, pp. 735-744.
Oculus VR, LLC, "Oculus Gear VR", downloaded from https://www.oculus.com/gear-vr/, admitted prior art, 9 pp. total.
Oculus VR, LLC, "Oculus Rift", downloaded from https://www.oculus.com/rift/, admitted prior art, 15 pp. total.
Oh, Kwan-Jung et al., "Depth Reconstruction Filter and Down/Up Sampling for Depth Coding in 3-D Video", IEEE Signal Processing Letters, vol. 16, No. 9, Sep. 2009, pp. 747-750.

(56) References Cited

OTHER PUBLICATIONS

Oh, Kwan-Jung et al., "Hole-Filling Method Using Depth Based In-Painting for View Synthesis in Free Viewpoint Television (FTV) and 3D Video", Picture Coding Symposium (PCS) 2009, May 6-8, 2009, 4 pp. total.

Ohm, Jens-Rainer, "Overview of 3D Video Coding Standardization", Proceedings of the Three Dimensional Systems and Applications (3DSA) International Conference 2013, 2013, pp. 1-4.

Olsson, Roger et al., "A Combined Pre-Processing and H.264-Compression Scheme for 3D Integral Images", 2006 IEEE International Conference on Image Processing, 2006, pp. 513-516.

Olsson, Roger et al., "A Depth Dependent Quality Metric for Evaluation of Coded Integral Imaging Based 3D-Images", 3DTV Conference, 2007, 4 pp. total.

Park, Jae-Hyeung et al., "Recent progress in three-dimensional information processing based on integral imaging", Applied Optics, vol. 48, No. 34, Dec. 1, 2009, pp. H77-H94.

Piao, Yan et al., "Sub-sampling Elemental Images for Integral Imaging Compression", International Conference on Audio Language and Image Processing (ICALIP), 2010, pp. 1164-1168.

Razavi, R et al., "Low-delay video control in a personal area network for augmented reality", IET Image Processing, vol. 2, No. 3, 2008, pp. 150-162.

Reed, Nathan, "Depth Precision Visualized", retrieved online at https://developer.nvidia.com/content/depth-precision-visualized, Jul. 15, 2015, 11 pp. total.

Shi, Shasha et al., "Efficient Compression Method for Integral Images Using Multi-View Video Coding", 2011 18th IEEE International Conference on Image Processing, 2011, pp. 137-140.

Shimizu, Shinya et al., "View Scalable Multiview Video Coding Using 3-D Warping With Depth Map", IEEE Transactions on Circuits and Systems for Video Technology, vol. 17, No. 11, Nov. 2007, pp. 1485-1495.

Shum, Heung-Yeung et al., "Survey of Image-Based Representations and Compression Techniques", IEEE Transactions on Circuits and Systems for Video Technology, vol. 13, No. 11, Nov. 2003, pp. 1020-1037.

Sjostrom, Marten et al., "Improved Depth-Image-Based Rendering Algorithm", 3DTV Conference: The True Vision—Capture, Transmission and Display of 3D Video (3DTV-CON), 2011, 4 pp. total.

Sloan, Peter-Pike et al., "Time Critical Lumigraph Rendering", Proceedings of the 1997 ACM SIGGRAPH Symposium on Interactive 3D Graphics, 1997, 7 pp. total.

Smolic, Aljoscha et al., "Coding Algorithms for 3DTV—A Survey", IEEE Transactions on Circuits and Systems for Video Technology, vol. 17, No. 11, Nov. 2007, pp. 1606-1621.

Solh, Mashhour et al., "Depth Adaptive Hierarchical Hole-Filling for DIBR-Based 3D Videos", Proceedings of the SPIE, Three-Dimensional Image Processing (3DIP) and Applications II, vol. 8290, 2012, pp. 829004-1 to 829004-11.

Sullivan, Gary J. et al., "The H.264/AVC Advanced Video Coding Standard: Overview and Introduction to the Fidelity Range Extensions", SPIE Conference on Applications of Digital Imaging Processing XXVII, Special Session on Advances in the New Emerging Standard: H.264/AVC, Aug. 2004, pp. 1-21.

Sutherland, Ivan E., "A head-mounted three dimensional display", 1968 International Workshop on Managing Requirements Knowledge, 1968, pp. 757-564.

Takahashi, Keita, "Theoretical Analysis of View Interpolation With Inaccurate Depth Information", IEEE Transactions on Image Processing, vol. 21, No. 2, Feb. 2012, pp. 718-732.

Takaki, Yasuhiro, "High-Density Directional Display for Generating Natural Three-Dimensional Images", Proceedings of the IEEE, vol. 94, No. 3, Mar. 2006, pp. 654-663.

Tanimoto, Masayuki et al., "Reference Software of Depth Estimation and View Synthesis for FTV/3DV", International Organisation for Standardisation, ISO/IEC JTC1/SC29/WG11, MPEG2008/M15836, Busan, Korea, Oct. 2008, 5 pp. total.

Texas Instruments, "DLP Technology for Near Eye Display, Application Report", Literature No. DLPA051A, available online at http://www.ti.com/lit/wp/dlpa051a/dlpa051a.pdf, Sep. 2014, 18 pp. total.

Tian, Dong et al., "View Synthesis Techniques for 3D Video", Applications of Digital Image Processing XXXII, Proceedings of the SPIE, vol. 7443, 2009, pp. 74430T-1 to 74430T-11.

Urey, Hakan et al., "State of the Art in Stereoscopic and Autostereoscopic Displays", Proceedings of the IEEE, vol. 99, No. 4, Apr. 2011, pp. 540-555.

Vetro, Anthony et al., "Overview of the Stereo and Multiview Video Coding Extensions of the H.264/MPEG-4 AVC Standard", Proceedings of the IEEE, vol. 99, No. 4, Apr. 2011, pp. 626-642.

Walls, Frederick et al., "VESA Display Stream Compression", Downloaded at http://www.vesa.org/wp-content/uploads/2014/04/VESA_DSC-ETP200.pdf, Mar. 3, 2014, pp. 1-5.

Wang, Zhou et al., "Image Quality Assessment: From Error Visibility to Structural Similarity", IEEE Transactions on Image Processing, vol. 13, No. 4, Apr. 2004, pp. 600-612.

Wegner, Krzysztof et al., "Enhanced View Synthesis Reference Software (VSRS) for Free-viewpoint Television", International Organisation for Standardisation, ISO/IEC JTC1/SC29/WG11, MPEG2013/M31520, Geneva, Switzerland, Oct. 2013, 4 pp. total.

Wetzstein, Gordon et al., "Compressive Light Field Displays", IEEE Computer Graphics and Applications, vol. 32, Issue 5, Sep./Oct. 2012, pp. 6-11.

Wetzstein, Gordon et al., "Tensor Displays: Compressive Light Field Synthesis using Multilayer Displays with Directional Backlighting", 2012 Proceedings of ACM SIGGRAPH Transactions on Graphics (TOG), vol. 31, Issue 4, Article 80, Jul. 2012, 11 pp. total.

Wikipedia, "List of refractive indices", https://en.wikipedia.org/wiki/List_of_refractive_indices, Dec. 7, 2003, 5 pp. total.

X Company, "Glass", downloaded from http://www.google.com/glass/start/, which redirects to https://x.company/glass/, admitted prior art, 6 pp. total.

Yan, P. et al., "Integral image compression based on optical characteristic", IET Computer Vision, vol. 5, No. 3, 2011, pp. 164-168.

Yang, Lu et al., "Artifact reduction using reliability reasoning for image generation of FTV", Journal of Visual Communication and Image Representation, vol. 21, 2010, pp. 542-560.

Yang, Lu et al., "Error Suppression in View Synthesis Using Reliability Reasoning for FTV", 3DTV Conference: The True Vision—Capture, Transmission and Display of 3D Video (3DTV-CONO), Jun. 2010, 4 pp. total.

Yi, Faliu et al., "Fast 3D Computational Integral Imaging Using Graphics Processing Unit", Journal of Display Technology, vol. 8, No. 12, Dec. 2012, pp. 714-722.

Yi, Faliu et al., "Simultaneous reconstruction of multiple depth images without off-focus points in integral imaging using a graphics processing unit", Applied Optics, vol. 53, No. 13, May 1, 2014, pp. 2777-2786.

Yoo, Hoon, "Artifact analysis and image enhancement in three-dimensional computational integral imaging using smooth windowing technique", Optics Letters, vol. 36, No. 11, Jun. 1, 2011, pp. 2107-2109.

Zhang, Cha et al., "Compression of Lumigraph with Multiple Reference Frame (MRF) Prediction and Just-in-time Rendering", Proceeding of the 2000 Data Compression Conference, DCC 2000 Snowbird, UT, USA; Mar. 28-30, 2000, Los Alamitos, CA, USA; IEEE Comput. Soc., Mar. 28, 2000, pp. 253-262.

Zhao, Yin et al., "Boundary Artifact Reduction in View Synthesis of 3D Video: From Perspective of Texture-Depth Alignment", IEEE Transactions on Broadcasting, vol. 57, No. 2, Jun. 2011, pp. 510-522.

Zhao, Yin et al., "Suppressing Texture-Depth Misalignment for Boundary Noise Removal in View Synthesis", 28th Picture Coding Symposium, PSC2010, Nagoya, Japan, Dec. 8-10, 2010, pp. 30-33.

"Notice of Allowance dated Jul. 3, 2019; Chinese Patent Application No. 201680023394.X", Jul. 3, 2019.

"Office Action dated Jul. 29, 2019; Taiwan Patent Application No. 105112774", Jul. 29, 2019.

(56) References Cited

OTHER PUBLICATIONS

Han, Zhun et al., "A New Scalable Free Viewpoint Video Streaming System Over IP Network", 2007 IEEE International Conference on Acoustics, Speech and Signal Processing—ICASSP '07, vol. 2, 2007, pp. 773-776.

* cited by examiner

| Header Name | Field Name | Bits |
| --- | --- | --- |
| Light Field Header | LF_FRAME_START_CODE | 32 |
| Rotation Header | ROT_START_CODE | 32 |
| | mQuant (seed) | 6 |
| | Fill bit | 2 |
| Translation Header | TRANS_START_CODE | 32 |
| | mQuant (residual) | 6 |
| | Fill bit | 2 |
| Hogel Header Seed Hogel | HOGEL_START_CODE | 32 |
| | Skip Transform Flag | 1 |
| | pos X | 2 |
| | pos Y | 2 |
| | Multicast PN ID (I) | 15 |
| | Fill bit | 1 |
| | Multicast PN ID (II) | 10 |
| | Fill Bit | 1 |
| Hogel Header Residual Hogel | HOGEL_START_CODE | 32 |
| | Skip Transform Flag | 1 |
| | pos X | 2 |
| | pos Y | 2 |
| | Skip Flag | 1 |
| | Texture Payload | 1 |
| | Disparity Payload | 1 |
| | R | 8 |
| | G | 8 |
| | B | 8 |
| Slice Header Disparity payload | DISPARITY_START_CODE | 32 |
| | PN_X | 3 |
| | PN_Y | 3 |
| | LAST_PACKET | 2 |
| Slice Header RGB Payload | TEXTURE_START_CODE | 32 |
| | PN_X | 3 |
| | PN_Y | 3 |
| | LAST_PACKET | 2 |

FIG. 12

METHODS AND APPARATUS FOR FULL PARALLAX LIGHT FIELD DISPLAY SYSTEMS

CROSS-REFERENCE TO RELATED APPLICATIONS

This application is a continuation of U.S. patent application Ser. No. 15/243,629 filed Aug. 22, 2016, which is a continuation of International Application No. PCT/US2016/028709 filed Apr. 21, 2016 which claims the benefit of U.S. Provisional Patent Application No. 62/151,656 filed Apr. 23, 2015, the disclosures of which are incorporated herein by reference.

BACKGROUND OF THE INVENTION

1 Field of the Invention

This invention relates generally to light field 3D imaging systems and methods thereof, such as image and video compression, decompression and modulation of light field image data used as input. The term "light field" describes the transmission and modulation of the light including, direction, amplitude, frequency and phase, therefore encapsulates imaging systems that utilize techniques such as holography, integral imaging, stereoscopy, multi-view imaging, Free-viewpoint TV (FTV) and the like.

2. Prior Art

In the present invention the holographic element or "hogel" is defined as the smallest unit of a sampled light field image and which contains information that can be directionally modulated by the 3D display to all available directions. Light field images can be represented as a 2D image matrix of hogels. The input images usually exhibit ample inherent correlation between hogels, which has been exploited in prior art (see M. Lucente, Diffraction-Specific Fringe Computation for Electro-Holography, Doctoral Thesis Dissertation, MIT Depart. of Electrical Engineering and Computer Science, September 1994, Ohm, J.-R., "Overview of 3D video coding standardization," In International Conference on 3D Systems and Applications, Osaka, 2013, Heun-Yeung Shum et al., "Survey of image-based representations and compression techniques," Circuits and Systems for Video Technology, IEEE Transactions on, vol. 13, no. 11, pp. 1020-1037, November 2003 and Kundu, S. "Light field compression using homography and 2D warping," 2012 IEEE International Conference on Acoustics, Speech and Signal Processing (ICASSP), pp. 1349-1352, 25-30 Mar. 2012), with compression algorithms to reduce image data sizes.

To improve the compression of light fields, new 3D video coding standards are considering the adoption of techniques from the field of computer vision (ISO/IEC JTC1/SC29/WG11, Call for Proposals on 3D Video Coding Technology, Geneva, Switzerland, March 2011). With the use of per-pixel depth, reference images can be projected to new views, and the synthesized images can be used instead of the costly transmission of new images. This technique requires an increased amount of computational resources and local memory at the decoder side, posing a challenge for its real-time implementation. The 3D video compression tools are also targeting their use in horizontally arranged sequences, and do not exploit the 2D geometric arrangement of light fields. Methods developed exclusively for light field image compression include a vector quantization method described by Levoy et al ("Light Field Rendering," Proceedings of the 23rd annual conference on Computer Graphics and Iterative Techniques, SIGGRAPH 96), and video compression-based methods described by Magnor et al (Data Compression for Light-Field Rendering, IEEE Transaction on Circuits and Systems for Video Technology, v. 10, n. 3, April 2000, pp. 338-343). The use of vector quantization is limited and cannot achieve high compression performances such as those presented by Magnor et al. Their proposed methods are similar to a multiview compression algorithm, where the geometrical regularity of the images is exploited for disparity estimation. However, the proposed compression algorithms require an increased amount of local memory, and are not suited for real-time implementation. Furthermore, standard 3D video compression algorithms (Ohm, J.-R., "Overview of 3D video coding standardization," In International Conference on 3D Systems and Applications, Osaka, 2013) or even specific light field compression methods (Heun-Yeung Shum et al., "Survey of image-based representations and compression techniques," Circuits and Systems for Video Technology, IEEE Transactions on, vol. 13, no. 11, pp. 1020-1037, November 2003 and Kundu, S. "Light field compression using homography and 2D warping," 2012 IEEE International Conference on Acoustics, Speech and Signal Processing (ICASSP), pp. 1349-1352, 25-30 Mar. 2012) cannot cope with the extremely large amounts of data generated by high-resolution light fields. As it can be appreciated by those skilled in the art, only a limited number of the compression methods described in the prior art can be implemented in real-time, and none of these methods can render and/or compress the amount of data required to drive a full parallax VAC-free display in real-time. Moreover, compression algorithms are usually designed for storage or network transmission (Bhaskaran, V. "65.1: invited Paper: Image/Video Compression—A Display Centric Viewpoint," SID Symposium Digest of Technical Papers, vol. 39, no. 1, 2008), and in the case of a light field display system, the display has specific timing and memory requirements that cannot be fulfilled by conventional compression algorithms.

3D systems traditionally are limited by the capabilities of the display to handle the huge data requirements of light fields. Even when compression is employed, displays have to process the decoded data, the size of which can easily overwhelm display systems. Instead of applying compression, many light field display implementations resort to a reduction in the dimensionality of the light field at the source as a compromise to the increase in data. Nevertheless, limiting the resolution of light field displays can have a significant impact on the perceived quality and even cause visual fatigue. For example, super multiview displays, such as the ones presented in Takaki, Y., "High-density directional display for generating natural three-dimensional images," Proc. IEEE, vol. 94, no. 3, pp. 654-663, March 2006, Balogh, T., "The HoloVizio system," Proc. SPIE 6055, Stereoscopic Displays and Virtual reality Systems XIII, 60550U (Jan. 27, 2006), and Iwasawa, S. et al., "REI: an automultiscopic projection display," Proc. 3DSA 2013, Selected paper 1, eliminate the vertical parallax of the light field, limiting the motion parallax to only horizontal movements. Integral Imaging displays (see Arai, J., "Three-dimensional television system based on integral photography," Picture Coding Symposium (PCS), 2012, vol., no., pp. 17-20, 7-9 May 2012, Javidi, B., Seung-Hyun Hong, "Three-dimensional holographic image sensing and Integral Imaging display," Display technology, Journal of, vol. 1, no. 2, pp. 341-346, December 2005, and Park, J. H., Hong, K. and Lee, B. "Recent progress in three-dimensional information processing based on integral imaging," Applied optics 48, no. 34 (2009)) reproduce full parallax light fields, but are limited by the display resolution, and usually reduce the angular resolution (and consequently the depth-of-field) to increase the spatial resolution. Methods for holographic displays (see M. Lucente, Diffraction-Specific Fringe Computation for Electro-Holography, Doctoral Thesis Dissertation, MIT Depart. of Electrical Engineering and Computer Science, September 1994) resort to decreasing the display refresh rates in order to reduce transmission medium bandwidth. The works in Holliman, N. et al., "Three-Dimensional Displays: A Review and Application Analysis," Broadcasting, IEEE Transactions on, vol. 57, no. 2, pp. 362-371, June 2011, Urey, H. et al., "State of the Art in Stereoscopic and Autostereoscopic Displays," Proceedings of the IEEE, On page(s): 540-555 Volume: 99, Issue: 4, April 2011, and Masia, B. et al., "A survey on computational displays: Pushing the boundaries of optics, computation and perception," Computers & Graphics 37.8 (2013) provide more examples of light field displays. However, those skilled in the art would immediately recognize that such techniques limit the capacity of a light field display to reproduce real 3D objects faithfully. The prior art fails to address the challenges imposed by high-resolution light field displays, such as high compression ratios, high quality, low computational load and real-time responses. Therefore, new methods and apparatus for high resolution light fields are required.

BRIEF DESCRIPTION OF THE DRAWINGS

In order to understand the invention and to see how it may be carried out in practice, specific embodiments of it will be described, by way of non-limiting example only, with reference to accompanying drawings. Consequently, detailed implementation elements are provided to assist in a comprehension of the exemplary embodiments, while the present invention can be practiced with different implementations. Well-known functions or constructions are not described in detail in order not to obscure the invention with unnecessary detail.

FIG. 12 shows a table with the header information of a possible embodiment of this invention.

DETAILED DESCRIPTION OF THE PREFERRED EMBODIMENTS

Figure 1:
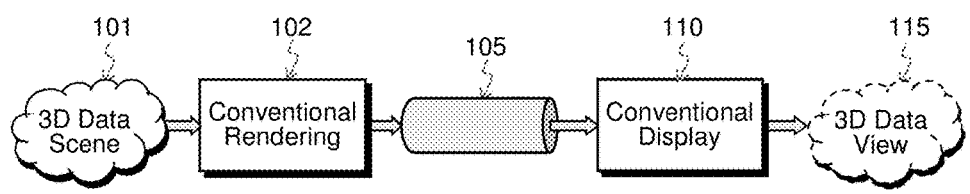
FIG. 1 illustrates the architecture of the prior art.

Three-dimensional (3D) displays are extremely valuable for medical, scientific, military, and entertainment visualization, virtual prototyping, and many more applications. Unfortunately, because computer displays present images on one surface, 3D displays often yield distortions in perceived 3D structure and cause discomfort and fatigue for the viewer. One of the biggest problems with 3D displays is the uncoupling of vergence and accommodation, denoted the Vergence-Accommodation Conflict (VAC) (Hoffman, D. M. et al., "Vergence-accommodation conflicts hinder visual performance and cause visual fatigue," Journal of Vision 8, no. 3, 2008), which reduces one's ability to fuse the binocular stimulus.

Light field displays (Alpaslan, Z. Y., et al., "Small form factor full parallax tiled light field display," in SPIE Conference on Stereoscopic Displays and Applications XXVI, 2015), however, modulate intensity and direction of the light ray's emitted or reflected from objects of a scene, and thereby allow the viewer to focus directly on the 3D object instead of the display's screen eliminating VAC. One of the ways to capture the light field is to parameterize the entrance and exit point of light rays in two parallel planes (Levoy, M. et al., "Light Field Rendering," Proceedings of the 23rd annual conference on Computer Graphics and Iteractive Techniques, SIGGRAPH 96). In order to reproduce the light field faithfully, the parameterized planes need to be densely sampled. This leads to huge amounts of data, and imposes extreme processing and memory demands on display systems.

For example, a display with XGA spatial resolution (1024×768), 100° field-of-view and a 0.4° angular resolution needs to modulate approximately 50 Gigapixels, which amounts to a total of 1.17 Tbits of data. The most advanced video compression format, H.264/AVC, can manage to compress ultra high resolution video frame (4,096×2,304 @ 56.3 frames/sec, or 0.5 Gpixels/sec) at a data bit rate of approximately 12 Gbits/sec (ISO/IEC 14496-10:2003, "Coding of Audiovisual Objects—Part 10: Advanced Video Coding," 2003, also ITU-T Recommendation H.264 "Advanced video coding for generic audiovisual services."), considering 24 bits per pixel. In order to compress a light field in real time at 60 Hz video rate, the same H264/AVC would need to be able to achieve data rates of up to 70 Tbits/sec, much higher than the maximum data rates currently allowed.

This invention discloses a method and an apparatus for light field 3D imaging that is able to reproduce the densely sampled light field by means of a display apparatus with very high pixel pitch. The invention utilizes a light field compression method disclosed herein to reduce the transmission medium bandwidth between the light field generator and the light field display device. Moreover, the disclosed apparatus is able to receive the compressed input and reconstructs the light field directly at the display.

The Quantum Photonic Imager (QPI imager) is a display technology that enables the production of full parallax light field displays with extremely high resolution, without compromising motion parallax or depth-of-field (see U.S. Pat. Nos. 7,623,560, 7,767,479, 7,829,902, 8,049,231, 8,243,770, 8,567,960 and El-Ghoroury, H. S. et al., "Quantum Photonic Imager (QPI): A New Display Technology and Its Applications," (Invited) Proceedings of The International Display Workshops Volume 21, Dec. 3, 2014). The QPI imager can achieve 5 µm pixel size, with high brightness and extended color gamut. It enables the construction of tiled displays, and its small pixel pitch provides the scalability to implement a high-resolution full parallax light field display with extended depth-of-field. A tiled display allows for the parallel processing of the light field, which is necessary for real-time light field displays. Nevertheless, the connection and management of all the elements needs to be carefully designed as well. The QPI imager provides a digital interface that is able to interconnect several other similar QPI imagers to implement a tiled display. The digital interface receives compressed data to reduce transmission medium bandwidth requirements, and performs data expansion directly at the display. Moreover, the compression algorithm was designed to take advantage of the hardware structure. Compressed color and additional information is sent to the display tiles, so that they can share and reuse data and achieve simultaneously higher compression and real-time decoding.

The present invention provides a means to display 3D holographic information in real-time. The method and apparatus presented in this patent is based on the system described in Graziosi et al., "Depth assisted compression of full parallax light fields", IS&T/SPIE Electronic Imaging, International Society for Optics and Photonics (Mar. 17, 2015), the disclosure of which is incorporated herein in its entirety by reference. Embodiments of the invention comprise of a digital computing component and method for computing that is especially suited for the processing of image and video data. The video data is highly compressed data representing 3-dimensional objects. Furthermore, the display and the processing elements are integrated into the same device. The architecture employed allows for parallel execution of processing components or processing elements utilizing instructions that are specifically suited to decompress the video data by means of but not limited to entropy decoding, data expansion, error correction, inverse image transform and color correction. Furthermore, the processing elements are specifically suited to prepare the data for display on its own surface, the display being a quantum photonic imager. The main input interface is connected to one of the many processing nodes, which then decides, based on an identification of that packet if the data is for that specific node or for any of the other nodes. In case the data packet belongs to a different node, the data is appropriately forwarded to the right destination. If the received data is destined to the processing node, the node processes the data according to its type. The data has a plurality of different flavors which all are decoded and used in subsequent steps for hogel texture generation. The final step is the preparation of the hogel texture for display. The disclosed invention reproduces in real-time a light field using low-power elements, and is able to provide immersive, VAC-free 3D perception.

The present invention makes use of some well-known techniques in the computer graphics field, which are defined herein for completeness.

In micro-lens based imaging systems, each micro-lens modulates the direction of the pixels generated by the hogel beneath the micro-lens. In refraction based imaging systems, a hogel is the smallest unit of the hologram that contains all of the modulated frequencies.

In computer graphics, the act of creating a scene or a view of a scene is known as view rendering. Usually a 3D model is used, along with lightning, surface properties and the camera point of view. This view rendering generally requires several complex operations and also a detailed knowledge of the scene geometry. An alternative technique to render novel views is to use multiple surrounding viewpoints. Known as Image-Based Rendering (IBR), this technique renders novel views directly from input images that oversample the light field. IBR generates views with more realistic quality, however it requires a more intensive data acquisition process, data storage and redundancy in the light field. A tradeoff between the complex geometrical models and the data intensive IBR is the use of depth information and a selected number of views. Each view has a depth associated with each pixel position, also known as depth maps. The depth maps are then used to synthesize the new views, a process called depth image-based rendering (DIBR) (see U.S. Pat. No. 8,284,237, "View Synthesis Reference Software (VSRS) 3.5," wg11.sc29.org, March 2010, and C. Fehn, "3D-TV Using Depth-Image-Based Rendering (DIBR)," in Proceedings of Picture Coding Symposium, San Francisco, Calif., USA, December 2004). DIBR utilizes the depth information and the extrinsic and intrinsic parameters of the virtual cameras to project points of a 2D screen into their respective 3D positions, and then re-project the 3D points on a target 2D screen, an operation also known as forward warping. The reverse operation is also valid, where the depth values of the target view are known, and the texture values are fetched from a reference view. In this case, the operation is called backward warping. The biggest issue with DIBR synthesis is the generation of holes, due to inaccuracy in depth values, round-off errors and objects disocclusion.

This invention deals with the compression and display of light field, including but not limited to aerial terrain texture images, radar, or LIDAR (Light Detection and Ranging) data with terrain elevations or city maps, landscapes, computer-generated 3D imagery, medical images, images taken with light field cameras or multiple cameras simultaneously or at different times. Light fields can be represented by the light rays that intersect with two parallel planes. The light ray intersections are uniformly sampled in both planes to form the acquired light field in a procedure equivalent to a 2D camera array setup. Each camera view is regarded as an "elemental image" or equivalently a hogel. This invention utilizes texture and associated geometrical information of the capturing camera views to compress the light field prior to transmission of the light field to the light field display device. The geometrical information used is the per-pixel disparity or parallax, which represents the displacement of an object between two adjacent camera views. The per-pixel disparity can be derived from depth and vice versa. The preferred embodiment uses disparity due to the simplicity of implementation at the decoder side, where instead of a division, only simple pixel shifts are used for warping; nevertheless, the same invention can be implemented using depth values. The compression is designed to take into account light field display's requirements, such as low latency and constrained memory; i.e., the compression algorithm matches the display capabilities. Thus, the compression method is called Display-Matched Compression. In comparison with prior art, the approach of this invention is able to substantially reduce the transmission medium bandwidth requirements between the light field generator and the light field display device by utilizing its computational capacity.

Figure 2:
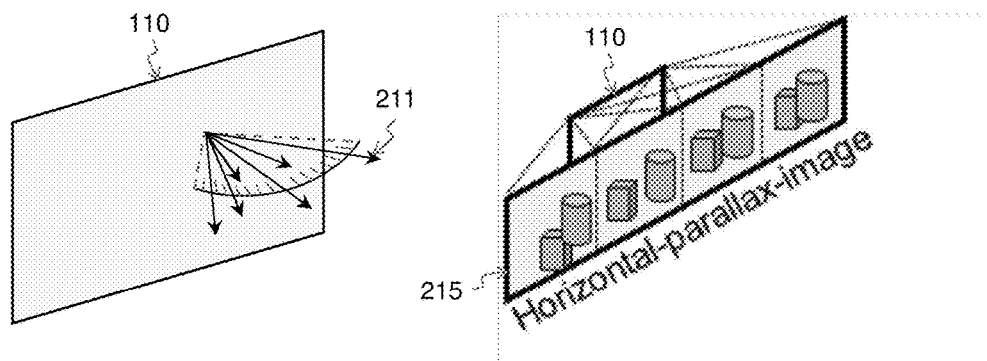
FIG. 2 illustrates a limitation of the prior art.

In prior art, depicted in FIG. 1, the 3D light field data 101 is sampled and digitized, by the rendering operation 102. The rendering operation generates a huge amount of data 105, which imposes high transmission medium bandwidth requirements for the connection to a conventional display 110, responsible for modulating the 3D data view 115. To reduce the processing load, viewing quality is often compromised in prior art by limiting the 3D effect to the horizontal axis. Consequently, as depicted in FIG. 2, the light rays 211 from any given point on the conventional display 110 project a horizontal-parallax image 215 to the viewer.

Figure 3:
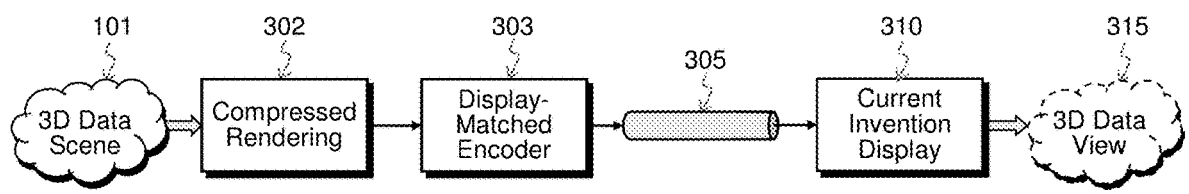
FIG. 3 illustrates the architecture of this invention.

As depicted in FIG. 3, the light field display disclosed by this invention 310 possesses significant computational capacity and is able to receive highly compressed data to significantly reduce the data 305 transmission medium bandwidth requirements while modulating the 3D data view 315. Compression of the 3D data 101 typically is achieved in two functional stages; namely, a Compressed Rendering 302 followed by a Display-Matched Encoder 303 generating a compressed bitstream tailored for the light field display device. As disclosed in Graziosi et al., "Depth assisted compression of full parallax light fields", IS&T/SPIE Electronic imaging. International Society for Optics and Photonics (Mar. 17, 2015), the rendering method adopted by this invention simultaneously renders and compresses the 3D data into a compressed light field format.

One possible embodiment of this invention uses a parallel encoding/decoding architecture aiming to achieve high compression within strict processing and memory constraints of the display system. In order to achieve the throughput and memory needed for processing the light field data, multiple Processing Nodes (PN) working in parallel decode their respective subset of hogels to reconstruct the entire light field collectively. It should be noted that Display-Matched Compression can be designed to match the choice of hardware at the display side and its processing throughput and memory capabilities. This is an important feature of Display-Matched Compression because it allows the 3D compressed imaging system of this invention to take full advantage of the continuous advancements in the semiconductor technology and the resultant increase in processing throughput and memory it offers progressively. Some variants of Display-Matched Compression are discussed in the embodiment described in the following paragraphs.

One example of the light field hogel partition of the light field used to implement Display-Matched Compression is to divide the hogel array into independent groups comprising N×N hogels. The value of N is one of the parameters that is selected dependent upon the display processing capabilities and can range from 1, when all hogels are decoded by independent PNs, to the entire light field when all hogels are processed jointly by one PN.

Figure 4:
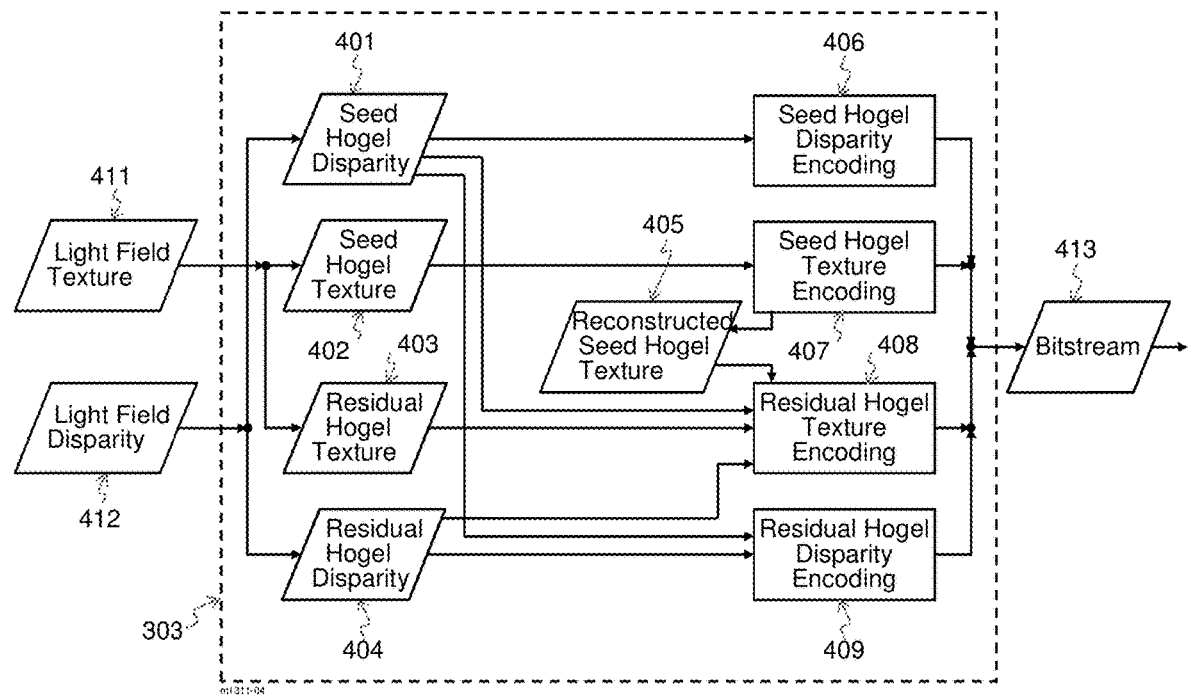
FIG. 4 illustrates details of the display-matched encoding process of this invention.

Display-Matched Compression is illustrated in FIG. 4. The light field typically incorporates a fair amount of correlation and needs to be compressed. This is accomplished in this invention by utilizing the display-matched encoder 303, which compresses the light field data (texture 411 and disparity 412) and generates a bitstream 413. In this embodiment one or more hogels within the PN hogel area, herein referred to as the "seed hogel", would be encoded independently and the remaining hogels, herein referred to as the "residual hogels" would be encoded relative to the selected seed hogels. Referring to FIG. 4, the seed hogel disparity 401 and seed hogel texture 402 of pixels from the seed hogel are encoded 406 407, as explained in the following paragraphs, and added to the bitstream 413. In order to encode the residual hogels using the seed hogels it is important that both encoder and decoder use the same reference. Therefore, the encoder structure illustrated in FIG. 4 includes the decoding loop 405 that reconstructs the exact same value of seed hogel texture and disparity as that to be used by the decoder. In the next encoding process illustrated in FIG. 4 the residual hogels texture 403 are disparity-compensated using the decoded seed hogel 405 and its corresponding disparity as reference, and only the residual information is encoded 408 and added to the bitstream 413. In case the disparity of the residual hogels 404 is beneficial for texture coding, since it could possibly improve the disparity-compensation prediction, the residual hogels disparity 404 could also be encoded using the seed hogel disparity 401 and inserted in the bitstream 413. The light field display then locally decodes the received data 413 and reconstructs (modulate) the array of hogels that constitutes the light field 411. Notice that in the present invention, the full reconstruction of the light field can be avoided by using the disparity information 412, resulting in a light field imaging system that deals with only compressed data. One possible embodiment of the present invention may use a compressive display such as U.S. Patent Application Publication Nos. 2010/0007804 and 2010/0225679 which describe methods to use discrete Walsh Transform (DWT), or discrete Cosine Transform (DCT) coefficients as the input to the display, and perform decompression using the integrative aspects of the human visual system (HVS).

Figure 5:
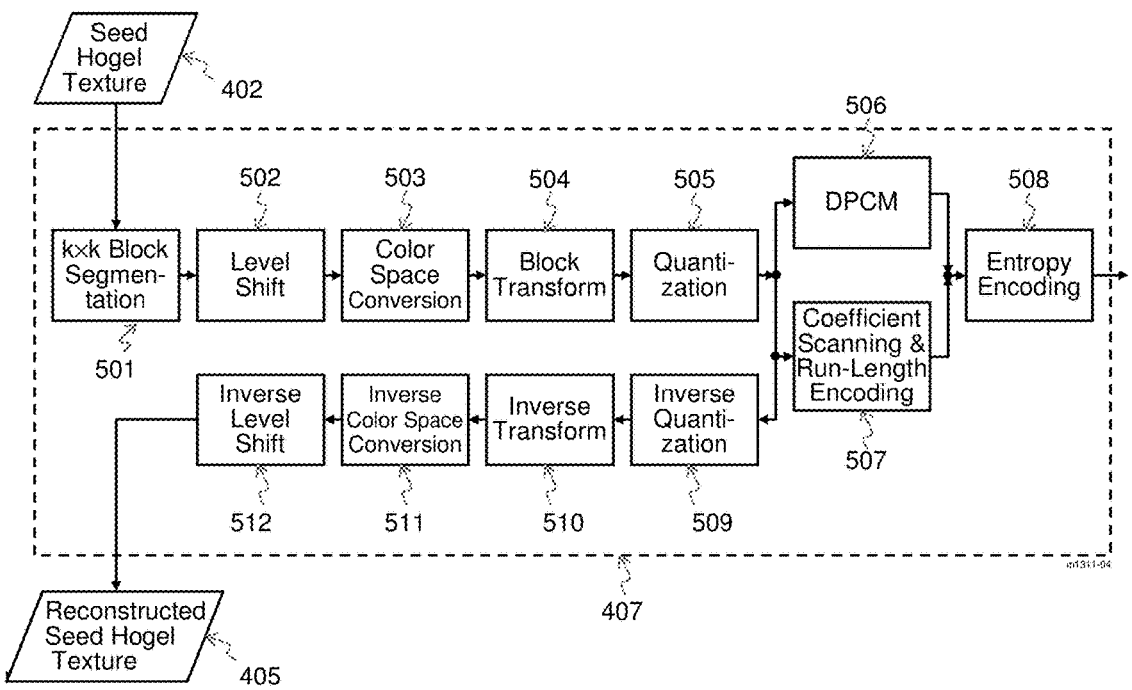
FIG. 5 illustrates the details for seed hogel texture encoding process used in one embodiment of the display-matched encoding process of this invention.

FIG. 5 illustrates the details for seed hogel texture encoding 407. The seed hogel texture 402 is segmented into blocks of k×k pixels 501. For each block of pixels, the seed hogel texture values are level shifted by a fixed value 502, that is, the pixel value is subtracted by the central value of the possible range of pixel values, in order to obtain positive and negative values (in the case of 8-bit range, a constant value of 128 is used). The seed hogel pixels color space is then converted to a color space that decorrelates the color channels 503. One example of color space conversion for this embodiment is the RGB to YCoCg color conversion (see Malvar, H. S. et al. "Lifting-Based Reversible Color Transformations for Image Compression", Proceeding SPIE Applications of Digital Image Processing, 2008); however other color spaces, including but not limited to YUV or YCbCr, may also be used without limitation. Next, an image block transform 504, such as DCT transform or an integer transform (see G. J. Sullivan et al., "The H.264/AVC Advanced Video Coding Standard: Overview and Introduction to the Fidelity Range Extensions," in SPIE Conference on Applications of Digital Image Processing) (XVII, 2004) or the like, is applied to each of the color channels. The transform concentrates the energy of the seed hogel texture block in only a few coefficients. These coefficients are then quantized 505, using a scaling parameter adjusted according to the statistics and the distribution of energy of the block transformation coefficients. Since seed hogels are used later as reference, the quality of block transformation coefficients needs to be preserved as much as possible. The DC coefficient, which usually contains most of the information of the block, is then coded separately, using a DPCM (Differential Pulse Coding Modulation) scheme 506, while the AC coefficients are scanned and coded, using for example zig-zag scan and run-length encoding 507. Finally the bitstream is entropy encoded 508 preferably using a Huffman entropy encoder, context-adaptive binary arithmetic encoder (CABAC) or a context-adaptive variable length coder (CAVLC) or the like. It should be noted that the scope of this invention is not limited to the encoding steps and methods described in this paragraph as illustrated in FIG. 5 and alternative encoding methods, algorithms and implementations are also possible within the context of this invention.

Figure 6:
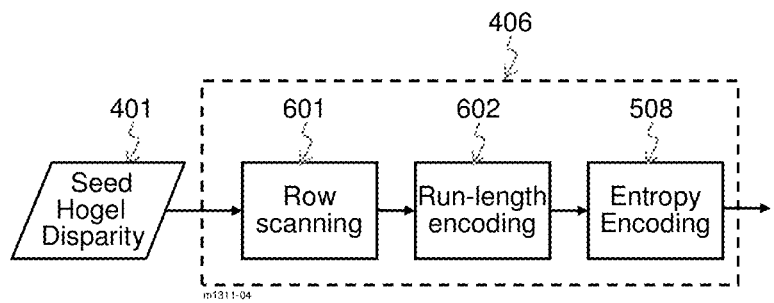
FIG. 6 illustrates the details of the seed hogel disparity encoding process used in one embodiment of the display-matched encoding process of this invention.

FIG. 6 illustrates the details of the seed hogel disparity encoding 401. Since there are no dependencies between the texture coding and the disparity coding of a seed hogel, the texture and disparity encoding can be performed independently either simultaneously or sequentially depending upon the available processing capabilities. For the encoding of the disparity values, a row scanning 601 of the values is done first then a run-length encoding 602 is performed. Finally, the values are entropy encoded 508 and added to the bitstream, whereby the entropy encoding is preferably performed using a Huffman entropy encoder, a context-adaptive binary arithmetic encoder (CABAC) or a context-adaptive variable length coder (CAVLC) or the like. In this embodiment, compression of the disparity information is done without any losses, but other schemes to compress disparity can also be used. It should be noted that the scope of this invention is not limited to the encoding steps and methods described in this paragraph as illustrated in FIG. 6 and alternative encoding methods, algorithms and implementations are also possible within the context of this invention.

Figure 7:
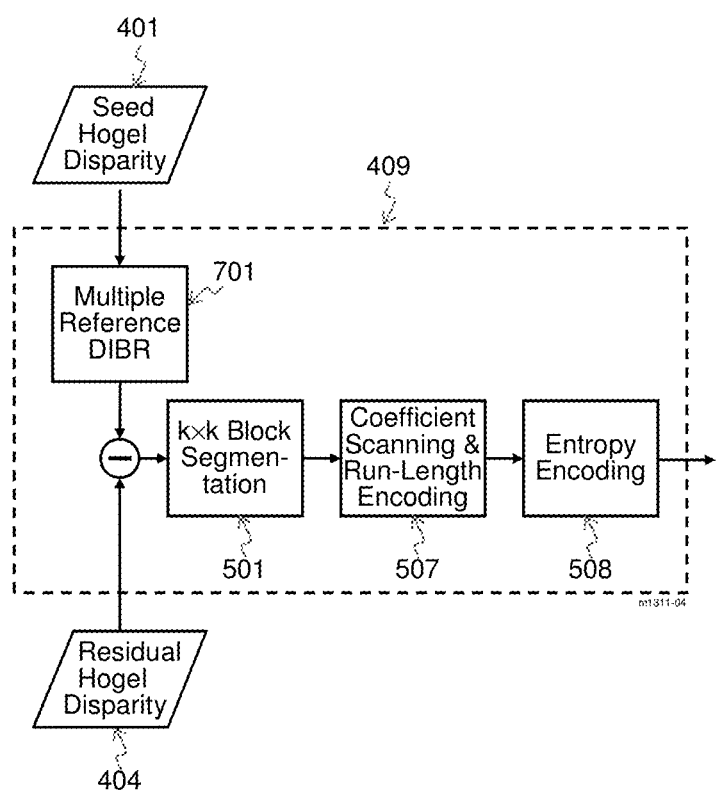
FIG. 7 illustrates the details of the residual hogel disparity encoding process used in one embodiment of the display-matched encoding process of this invention.

FIG. 7 illustrates the details of the processing of the residual hogel disparity 404 performed in the residual encoding process 409 of FIG. 4. As depicted in FIG. 7, difference values between the residual disparity 404 and the warped seed disparity (i.e., shifted seed disparity after applying the DIBR 701) are segmented into blocks of k×k pixels 501, and since most of the blocks will likely be zero, only the non-zero values are processed further. These non-zero values are then scanned (for example, zig-zag scan) and run-length encoded 507 then also entropy encoded 508 before being processed further. Similar to the seed disparity, the disclosed procedure is lossless. However, skilled in the art will immediately recognize variations of this scheme including lossless and lossy compression are also included in this invention.

Figure 8:
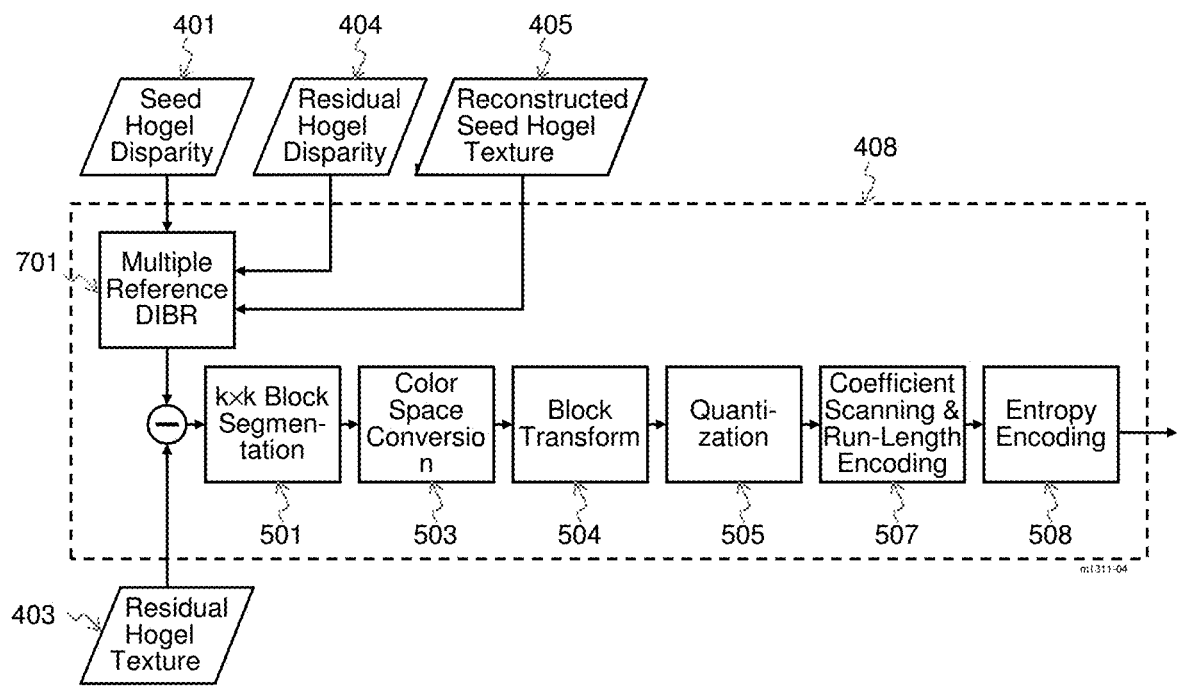
FIG. 8 illustrates the details of the residual hogel texture encoding process used in one embodiment of the display-matched encoding process of this invention.

FIG. 8 illustrates the details of the processing of the residual hogel texture 403 performed in the residual encoding process 408 of FIG. 4. Referring to FIG. 8 the reconstructed seed hogels texture 405 (which is the output of the seed encoding step 407 of FIG. 4), its decoded disparity (which is the exactly the same value as the seed disparity 401, since the disparity was coded losslessly), and the residual disparity 404, a suitable disparity-compensated reconstruction of the residual hogel texture is obtained by the DIBR 701. This disparity-compensated prediction of the residual hogel texture is formed by shifting the seed hogel pixels to the residual hogel position. In case only one reference seed hogel is used, holes might occur during this warping operation. Block-based transform coding is used to code the holes and any resultant inaccuracies from this warping operation. Similar to the process of seed hogel texture encoding of FIG. 5, the difference between the residual hogels texture 403 and its disparity-compensated prediction 701 is divided into blocks of k×k pixels 501, their color space is converted 503, transformed 504, quantized 505, scanned and run-length encoded 507. The result is entropy encoded 508 and added to the bitstream. It should be noted that the scope of this invention is not limited to the encoding steps and methods described in this paragraph as illustrated in FIG. 8 and alternative encoding methods, algorithms and implementations are also possible within the context of this invention.

Bitstream Timing—

Figure 9:
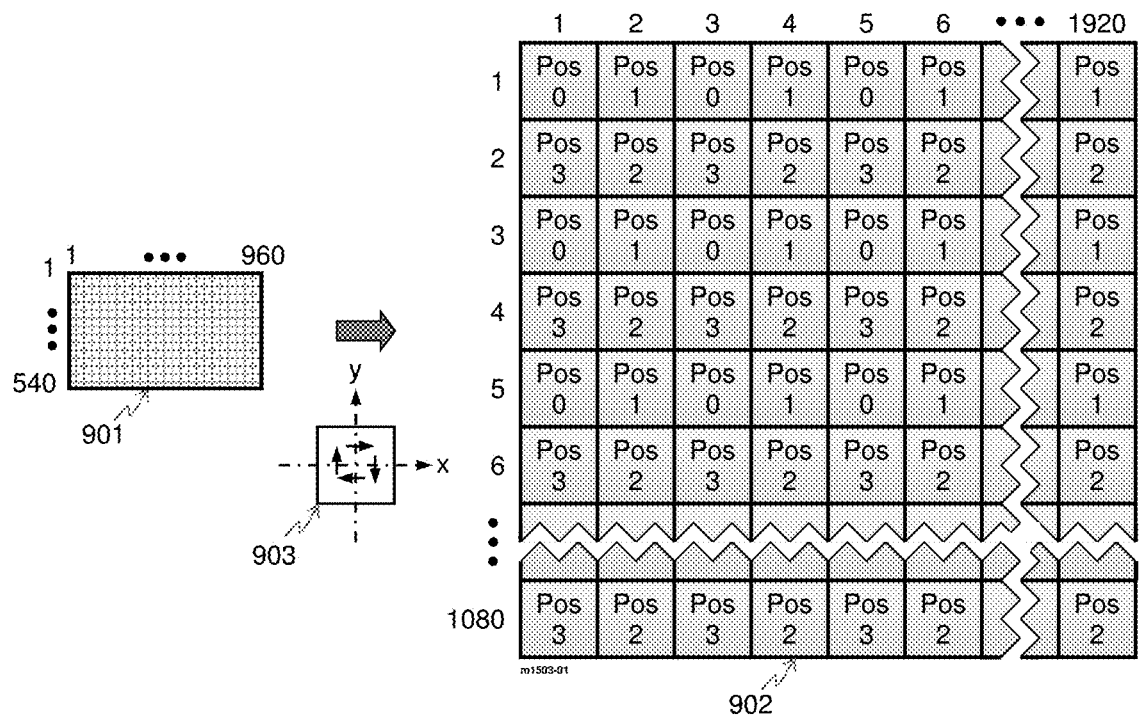
FIG. 9 depicts the assembly's translation to augment the light field resolution.
Figure 10:
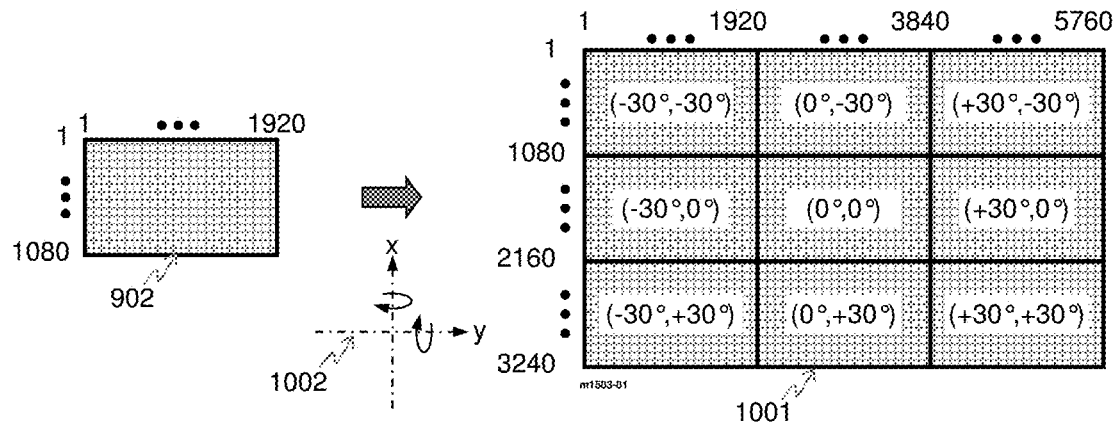
FIG. 10 depicts the assembly's rotation to augment light field resolution.
Figure 11:
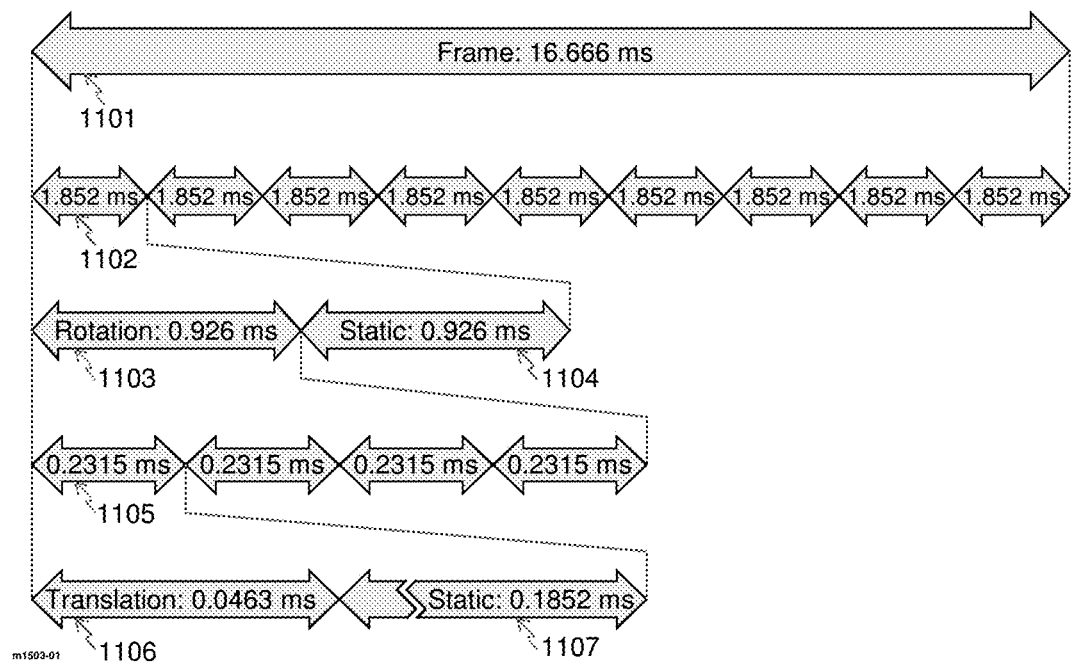
FIG. 11 shows the timing of a embodiment of this invention that uses rotations and translations to increase the light field resolution.
Figure 13:
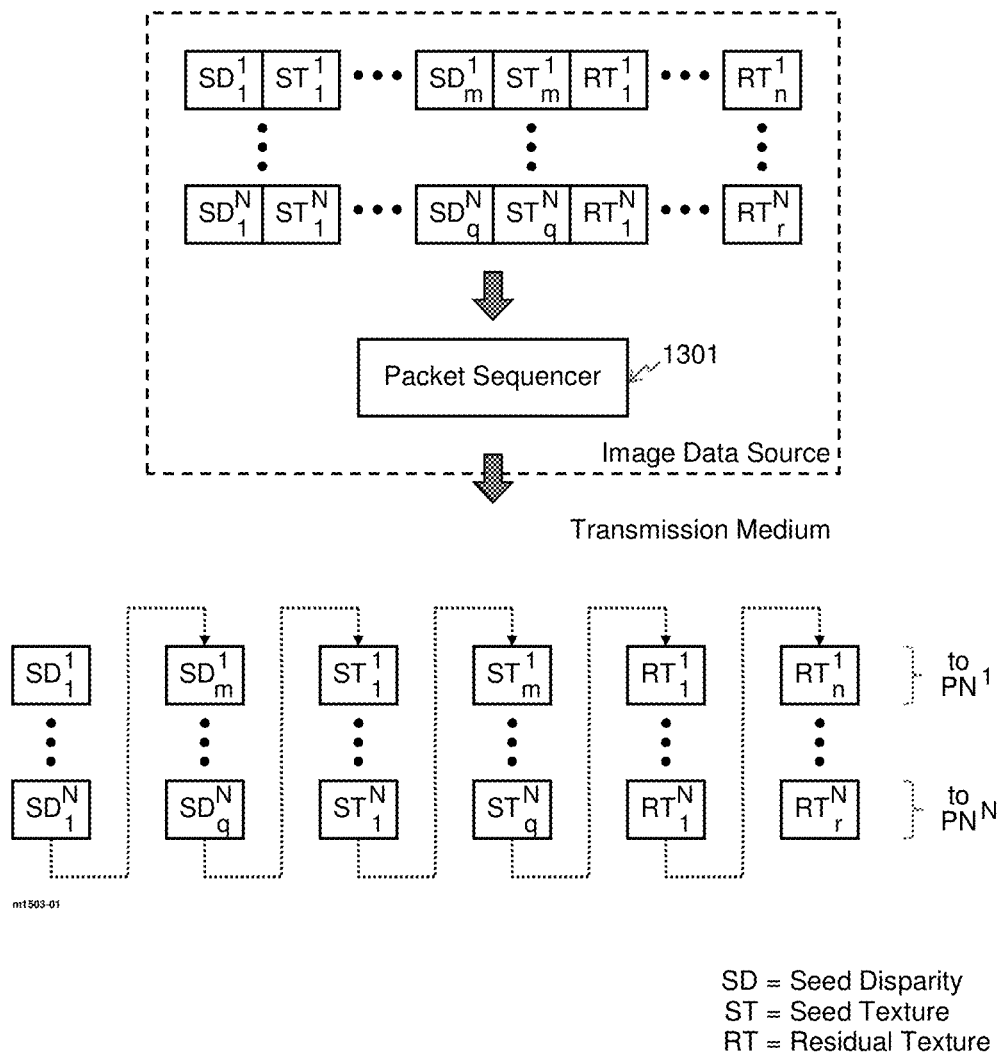
FIG. 13 depicts a possible strategy of a packet interleaver for just-in-time decoding.

The QPI imager display can also be used in unique spatio-optical (U.S. Patent Application Publication No. 2013/0141895) and spatio-temporal (U.S. Patent Application Publication No. 2013/0258451) light field modulator configurations to improve the system performance. By incorporating articulated movement of the entire assembly, the field-of-view as well as spatial resolution of the light field display can be increased. The impact for the compression algorithm is an increased amount of data for compression. For example, in FIG. 9 we can see an example of increase of spatial resolution by translating the image vertically and horizontally 903, from a native resolution 901 of quarter HD image (960×540) to a displayed resolution 902 of full HD (1920×1080). Notice that the pixels of the high resolution image need to be sent to the display in groups, indicated by the pixel position of the displayed image 902. This pixel grouping impacts the compression algorithm as well. For example, all pixels in position 0 need to be ready for display before the pixels in position 1, so the compression needs to take into account the pixel presentation time when performing compression. Notice that the order presented in FIG. 9 is only exemplary, and other orders are possible as well. In FIG. 10 we see the effect of rotation 1002 of the display assembly. In this example, an image is rotated ±30° along the x- and y-axis to increase its field-of-view. With such a movement, the new image 1001 has a pixel count 9× higher than before. Similar to the translation, rotations also are presented in separate time frames, and all the data needs to be ready for modulation before the display reaches that particular position. In FIG. 11, the hierarchical structure of the time division using rotations and translation is illustrated. For a 60 frames per second, each frame 1101 has 16.666 ms for display. This time is divided between the rotations 1102. For each rotation slot, the time is divided into the duration of the assembly movement 1103 and the time that the assembly is stationary in a particular position 1104. This time slot is then divided into the 4 translations 1105, where each translation slot is divided into the time that it takes for the assembly to move to that particular position 1106 and the time that the assembly is stationary 1107. The translational position and rotational position of the assembly is conveyed to the decoder by means of specific headers, as illustrated in the table depicted in FIG. 12. The bitstream is segmented into packets differentiated by their headers, which are then distributed among the processing nodes for appropriate display. Notice that in a parallel architecture, many packets are generated at the same time. Due to the time constraints of the display, some packets need to arrive to the display before others. Therefore, the packets are arranged also in a corresponding order. FIG. 13 shows an embodiment of a method that reorders 1301 the packets to allow just-in-time decoding. Since the seed hogels might be used for display but also are used as reference by the residual hogels, they need to be sent first. In order for all the processing nodes to start the decoding process during the rotation period, they need to receive at least the seed information and the first translation. Therefore, the packets of all the processing nodes are interleaved so that each node can start processing part of the information as the packets arrive. Local memory can store the processed information (decoded seed hogel), and with only the seed information, the processing nodes are able to start generating the prediction for the residual hogels. Once the texture for the residual hogels arrives, the prediction can be corrected and the content is ready for display.

Adaptive Hogel Coding Rate Optimization—

Figure 14:
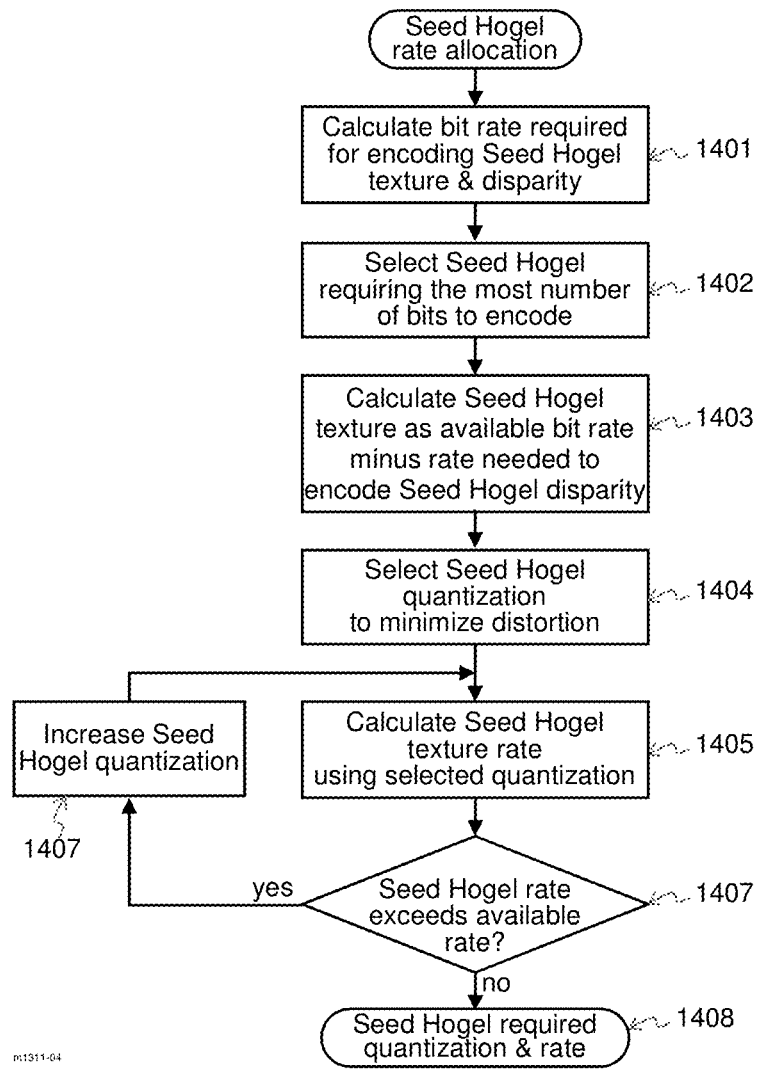
FIG. 14 illustrates the method for bit rate allocation for seed hogels used in one embodiment of this invention.
Figure 15:
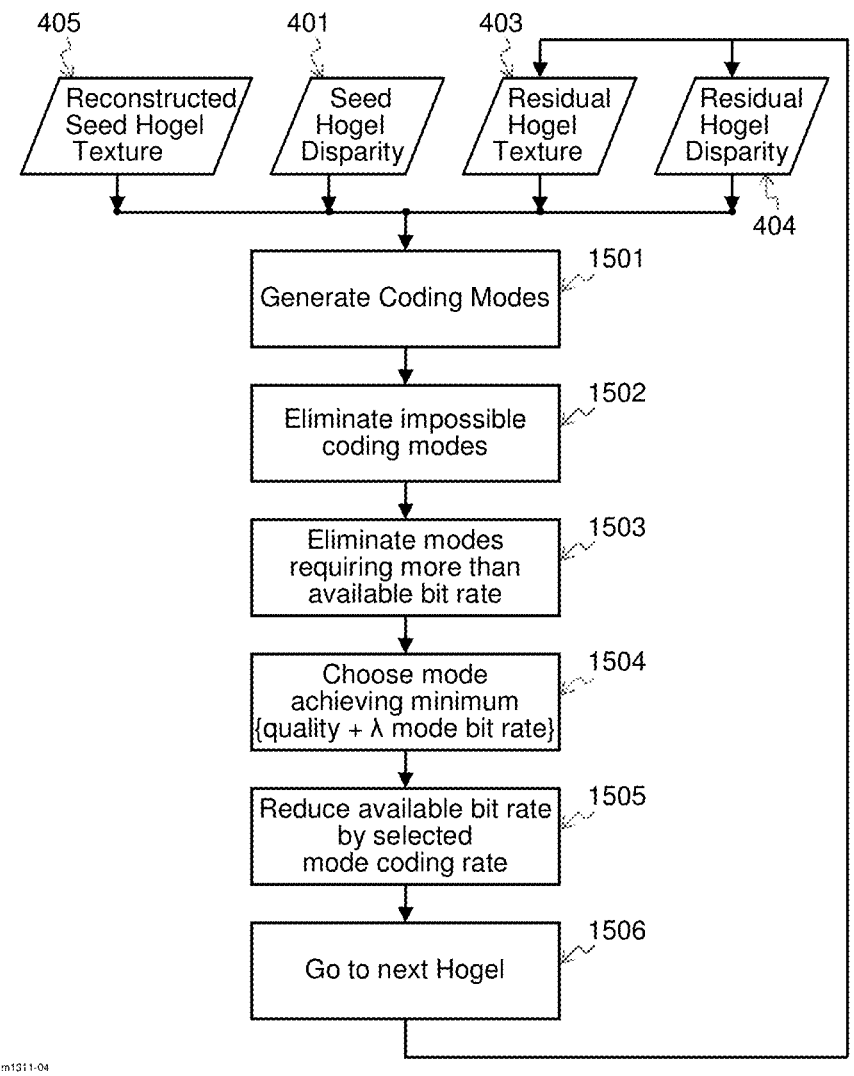
FIG. 15 illustrates the method for bit rate allocation for residual hogels used in one embodiment of this invention.

One important characteristic of the display-matched compression aspects of this invention is the adaptive allocation of the interface transmission bit rate between the various components of the light field display system. Given the excessive interface bit rate needed by 3D display systems, the available interface data rate (or bit rate) is considered to be the main bottleneck in most all 3D display systems. Since in the 3D Compressed Imaging system of this invention seed hogels are used as reference, these hogels are encoded with more bits to preserve their quality as much as possible, and are given the priority in the allocation of interface data rate (or bit rate) and the parameters for coding the residual hogels are adaptively selected subject to the constraints of the available interface data rate. FIG. 14 and FIG. 15 illustrates the methods this invention applied to adaptively allocate the bit rate for the seed hogels and for the residual hogels; respectively. Referring to FIG. 14, the total number of bits available for encoding the seed hogels texture and disparity is calculated 1401. One possible embodiment of this invention considers the timing shown in FIG. 11. The available number of bits for seed encoding can be determined by the following equation:

$$\text{Seed Encoding Bits} = \frac{\text{Clock} \times \text{Factor}}{fps \times \#rotations} \times \% \text{ Time,}$$

Where Clock indicates the frequency of the clock, Factor is a multiplication factor that depends on the memory being utilized (if the memory permits parallel read/write, then the parallelism is reflected in this factor), fps is the number of frames per second, # rotations is the number of rotations, and % Time is the percentage of the particular time slot that is used for data transmission (for example, the given timing in FIG. 11 indicates a 50% time spent rotating the assembly, which can be used for data processing). The texture of the seed hogel that requires the most number of bits to code its disparity is selected to optimize the encoding quantization step size 1402. The coding quantization step size, used in the quantization block 505 of FIG. 5, controls the level of information present in the coefficients of the texture, and can reduce the number of bits necessary to encode the hogel at the cost of introducing possible distortion. The bit rate available for coding this seed hogel texture is determined by the total available bit rate minus the rate needed to code the disparity information and header information 1403. The coding quantization step parameter that results in the minimum distortion possible in coding the seed hogel texture is selected 1404 and the corresponding coding quantization step size is then used to calculate the bit rate required for coding the seed hogel texture 1405. A quantization step size for coding the seed hogel texture is selected when the calculated bit rate is less than the available bit rate 1406, and output 1408 otherwise the quantization step size is increased 1407 and the seed hogel texture bit rate is recalculated until seed hogel texture bit rate is below the available bit rate. Referring to FIG. 15, there are several possible encoding modes 1501 that can be employed to match the coded residual hogels bit rate to the available remaining bit rate, such as sending the correction texture, disparity, or even skipping the hogel and using only the available prediction. The feasibility and resulting quality in using any one of such modes respective to the bit rate needed to code the residual hogel is assessed and coding modes that are not feasible are eliminated as a choice 1502. Coding modes that result in bit rate that is greater than available bit rate are also eliminated 1503. Similar to the equation for the number of bits used for seed hogels, the available number of bits for residual hogel encoding can be determined by the following equation:

$$\text{Residual Encoding Bits} = \frac{\text{Clock} \times \text{Factor}}{fps \times \#rotations \times \#translations} \times \% \text{ Time,}$$

where Clock indicates the frequency of the clock, Factor is a multiplication factor that depends on the memory being utilized (if the memory permits parallel read/write, then the parallelism is reflected in this factor), fps is the number of frames per second, # rotations is the number of rotations, # Translations is the number of translations, and % Time is the percentage of the translation time slot that is used for data transmission. Selection among the remaining coding modes is accomplished using a Lagrange cost optimization 1504, where the cost function is defined by a selected quality metric (for example, minimum distortion) plus lambda times the bit rate, where lambda is a parameter derived from the quantization step. The optimization of the residual hogels coding bit rate takes into account the available bit rate and selects the coding mode having the smallest cost function and subtracts the amount of bits used from the total of bits available for residual hogel encoding 1505 and proceeds to the next hogel 1506, and in order to preserve the selected quality metric, resorts to coding modes that use less bits only in case of lack of sufficient bit rate 1502.

Decoding of the Compressed Light Field—

Figure 16:
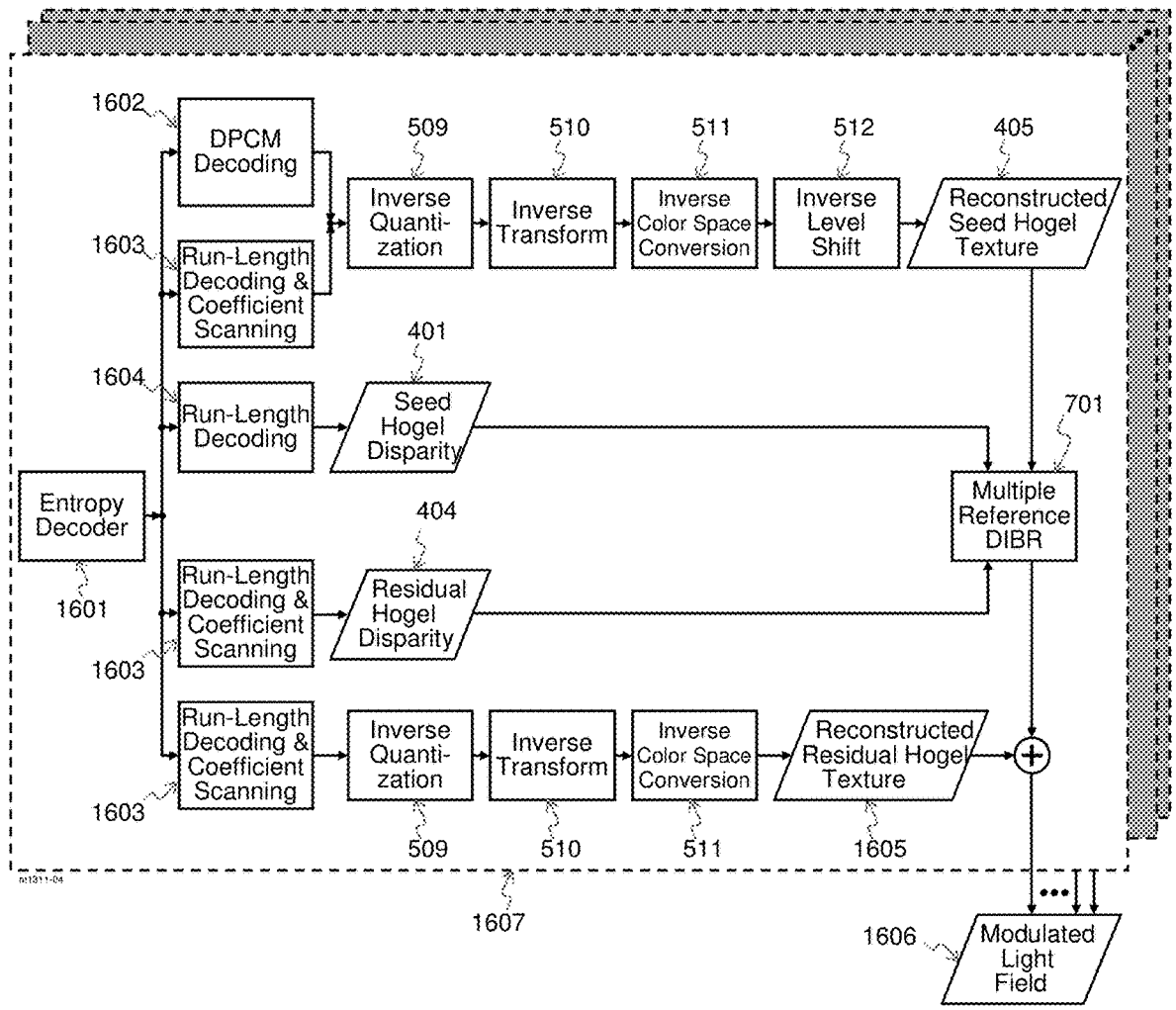
FIG. 16 illustrates the decoding of the received bit stream at the display side of the 3D imaging system of this invention.

FIG. 16 illustrates the decoding flow of the bitstream received at the light field display. One of the main virtues of the display-matched compression aspects of this invention is that it makes it feasible for the light field display to receive the compressed bitstream and directly decode the bitstream to reconstruct the light field, since the hogel compression of this invention is made to match the timing requirements and computational capacity available at the display side. Referring to FIG. 16, the decoder at the display side receives the bitstream and performs the processing in the compressed domain only to reconstruct the light field while avoiding the use of expanded data approach used in conventional decompression techniques. As illustrated by FIG. 16, the light field display receives the encoded bitstream and first performs entropy decoding 1601. The bitstream is typically packetized using headers that identify the type of packet and the coordinates of the related hogel on the display surface, an embodiment of which was presented in FIG. 12. Several packet types are used to signal the diverse light field information, and four types of such packets contain actual hogel payload information that needs to be further decoded by the display: the seed hogel texture, the seed hogel disparity, the residual hogel texture and the residual hogel disparity. For the seed hogel texture, the inverse operation of the encoding side is performed at the light field display side, where the DC coefficient is obtained after DPCM decoding 1602, while the other coefficients are obtained after run-length decoding and scanning 1603. The received seed hogel texture data is further inverse quantized 509, inverse transformed 510, color-space converted 511 and level shifted 512 ton generate an exact replica of the restructured seed hogel texture 405. The received seed disparity data is run-length decoded 1604 to generate an exact replica of the seed hogel disparity 401, and then both the reconstructed seed hogel texture 405 and the decoded disparity 401 are kept in the display local memory to be used by DIBR block 701 to generate a decoded value for the residual hogel texture 403. As illustrated in FIG. 16, the received residual hogel disparity data is run-length decoded and scanned 1603, then combined using a DBIR process with decoded seed hogel disparity 401 stored in memory to generate the decoded residual hogel disparity 404. As illustrated in FIG. 16, the received residual hogel texture data is run-length decoded and scanned 1603, inverse quantized 509, inverse transformed 510 and color space converted 511 producing the reconstructed residual hogel texture 1605. This reconstructed residual hogel texture 1605 is used in conjunction with the stored values of the seed hogel disparity 401, the reconstructed seed hogel texture 405 and the residual hogel disparity 404 by a DBIR process to generate the modulated light field 1606. It should be noted that the preceding flow the decoding the residual hogel disparity 404 and texture 1605 can use either a single-reference DIBR for a minimal use of memory at the display; or alternatively multiple seed hogel references can also be used in conjunction with an multiple reference DIBR (MR-DIBR), as described in U.S. Patent Application Publication No. 2015/0201176. It should also be noted that a parallel implementation of the light field decoding flow illustrated in FIG. 16 is also possible, each parallel implementation being in accordance with the block diagram 1607.

The apparatus of this invention is composed of a digital circuit, an analog circuit driving the three stacked LED layers, red, green and blue. The interface into the QPI imager is a high-speed interface which transports compressed data. A second interface sends data from the digital portion of the QPI imager to the analog portion of the QPI imager. That interface is implemented as a Through-Silicon Via (TSV) interface and transports a partially decompressed data stream. A partial decompression takes place in the digital ASIC, whereas the final decompression step takes place in the analog ASIC before the analog ASIC displays the pixel information. The third interface is the pixel contacts. For example, considering the imager having 1000×1000 pixels with each pixel having RGB contacts, this translates to 3 million pixel contacts. A common anode voltage is provided which is shared by the three diodes. The anode voltage is only controlled in a very limited manner. Nevertheless the cathodes are used to control the three colors which make one pixel. They provide a constant, well stabilized current through each pixel, whereas the brightness can be controlled to a high degree by pulse modulation. The pixels are organized in hogel structures of N×N physical pixel implementations, which are time-multiplexed and applied to M different image locations, obtained from rotations and translations of the assembly. The hogels are grouped together in sets of L×L, and a single pixel driver is responsible for providing the data to the entire group. An example of pixel grouping utilizes 50×50 pixels per hogel, 4×4 hogels per processing node (PN), and 5×5 PNs for each QPI imager.

Figure 17:
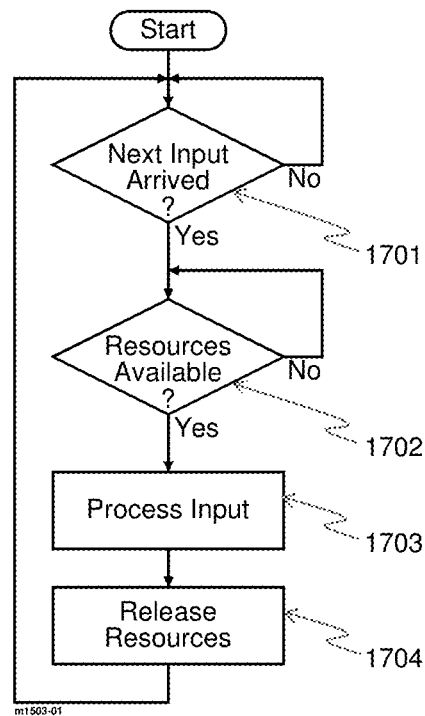
FIG. 17 shows the state machine diagram flow utilized for the conception of the firmware software, that manages the hardware units.

The processing nodes are interconnected via a high speed interface (HSI), and are capable of processing instructions that work on large sets of data and reconstruct the light field directly from the compressed bitstream. The processing nodes are composed of a set of specific hardware units, whose functionalities are explained below. The hardware units need to work in synchronism, since usually the output of a unit is the input for another unit. The processing blocks are managed via a firmware or application specific integrated circuits that may be programmable, that check the status of the units and the resources needed to process a specific task, and configure the units accordingly. FIG. 17 shows a general flowchart of the hardware management procedure. At first, the hardware is in an idle state, waiting for an input to arrive 1701. For example, one hardware unit could be waiting for the arrival of packets for decoding, while another hardware unit could be in a state waiting for a memory content to achieve a desired status. Once the input is present, the hardware needs to check for the resources necessary to execute its task 1702. For example, a unit might need to check if there is enough memory available to write its output. The hardware stays in that state until the necessary resources becomes available, when it can then process the input 1703. Once the hardware is done executing its task, it releases the resources to be consumed by the next unit in line 1704. Then the hardware restarts the execution flow by checking for the arrival of new input. Most of the hardware units described below have a similar flowchart, with some specific variations according to the hardware characteristics.

HSI Interface—

Figure 18:
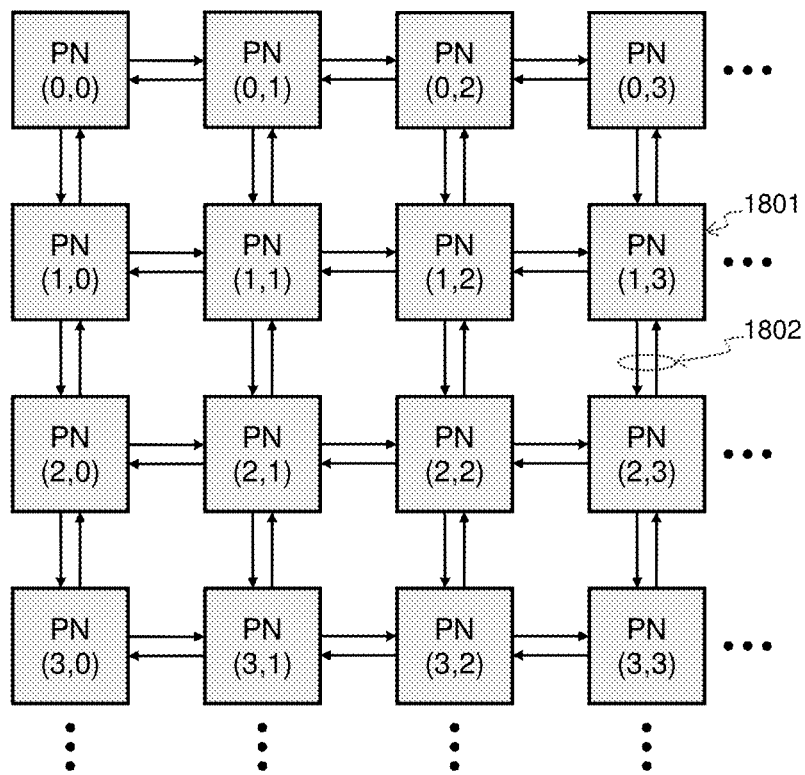
FIG. 18 illustrates the interconnection between the processing nodes.

The data packets are received through the IO high speed interface that interconnects all processing nodes. FIG. 18 shows an example of PNs 1801 interconnected via HSI 1802. The data has an id to distinguish between the different PNs. The received data is analyzed in the receiver component which provides an identifier and the status of the elements in the received package. Specifically a part of the package provides type information. The software reads the type information and based on that type information a status for the first packet is formed. The status contains information about the progress of the calculations performed on that packet. The HSI interface delivers the packets to the next processing hardware, in one embodiment of this invention an entropy decoder. Both hardware units share a common bank of memories to transfer the content from one unit to another. The firmware manages the transfer, following the procedure flowchart detailed in FIG. 17. The packets come into a FIFO memory, where they are analyzed first. If the packet header indicates that the packet contains a data that needs to be decoded, the unit needs to check for resources, that is, look for an available memory from the shared memory bank. Once a memory becomes available, the data is transferred from the HSI interface to the memory, to be consumed by the entropy decoder. When the transfer is done, the firmware looks for an available decoder unit to receive the packet. When a decoder is found, it is programmed to decode that specific packet type, the memory ownership is released, and the hardware goes back to verifying the content of new packets.

Figure 19:
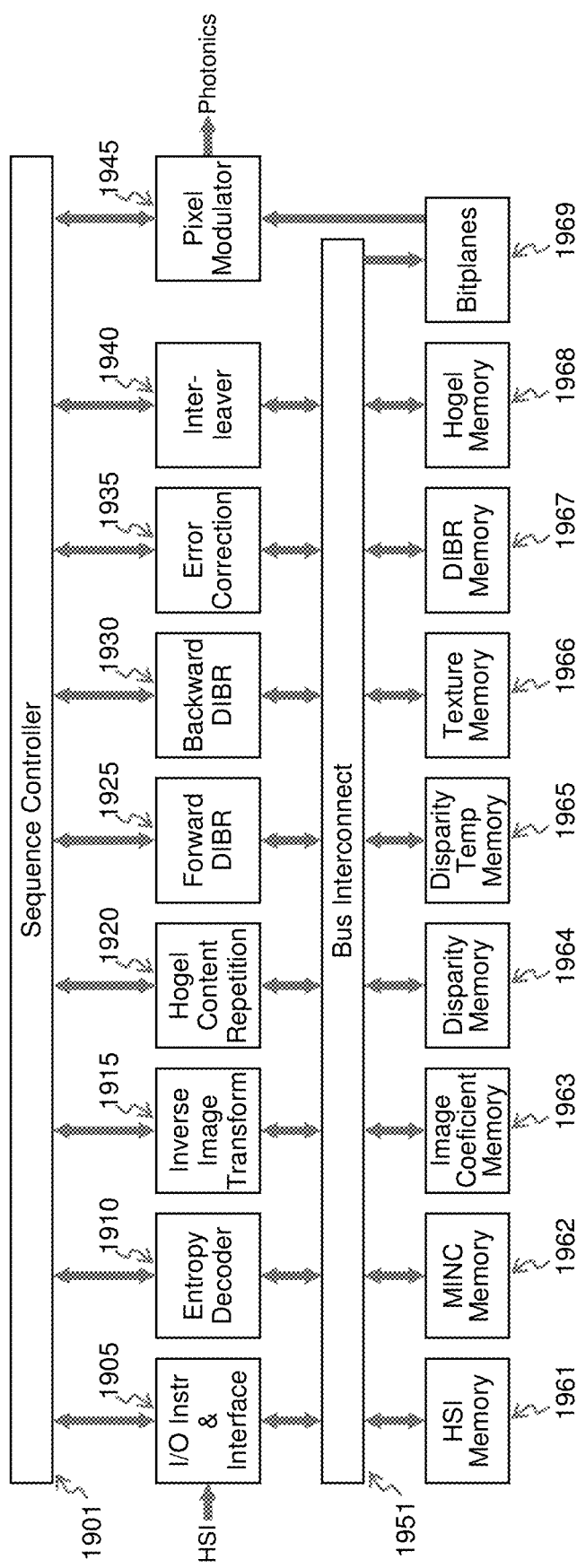
FIG. 19 shows the internal structure of the processing node, with all its hardware units and memory blocks.

A possible embodiment of the internal architecture of the processing node can be seen in FIG. 19. The hardware units that comprise the PN are responsible for decompressing the received bitstream and reconstructing the light field. The PN is responsible for a hogel area, and it first receives the seed hogel, from which the other hogels are derived. The seed hogel might be a hogel that belongs to the PN area or not. In case several PNs share the same hogel, a bit pattern indicating to which PN the seed hogel belongs to is used in the seed hogel header, as shown in the table of FIG. 12. The PN utilizes the interconnection 1951 to send seed hogel information from one PN to another. Internally, ping-pong buffers are used allowing the continuous flow of data between the hardware units in order to achieve real-time decoding performance. The PN hardware provides specific instructions for the development of customized firmware. The instructions comprise I/O, decompression (entropy decoding, run-length decoding, zig-zag decoding, dequantization, inverse image transform), copy and shift, error correction, color correction, gamma function, bitplane generation, load and pixel modulation control. Notice that the PN contains enough memory to hold one or more seed hogels, supporting also temporal compression. Next, each single hardware unit is explained, as well as the logic used by the firmware to control the hardware and synchronize the decoding flow.

Entropy Decoder—

The input memory 1961 bank shared with the HSI module 1905 has several independent memory modules to allow simultaneous read and write in the memory bank. The HSI receives and reads the status and the type of the packet and determines what to do next. The next step after reading the packet into the first memory is to decode it correctly. The entropy decoder starts by reading as many words as necessary to fill its internal FIFO buffer. Based on the type information the entropy decoder 1910 is reprogrammed so that the data is correctly decoded. The hardware unit 1910 generates the decoded results together with increment values. The two pieces of information together with the type and the status information are stored in two separate memories, one that stores DC and AC coefficients of a transformed image 1963, and another memory that stores the memory increments (Minc) from one decoded block to another 1962. The entropy decoder can be freely programmed to accept AC, DC and Minc values in any order. The control is performed through a sequence controller 1901, which also controls the operation of the other modules of FIG. 19, normally in response to status information from the respective module. The status information now shows that the data is decoded and therefore can be consumed by the next modules. The software selects the next module to continue with the decoding process depending on the type of decoded data, that is, if the decoded data belongs to a seed or residual hogel, or if the information is disparity or texture information. The decoding of incoming data is based on a lookup table, which can be freely programmed. The lookup table contains the actual length of the word, the run-length information, which is the number of words to skip, and the actual value. The same engine also contains the lookup table for the zig-zag decoder. Many parameters are defined to support a flexible entropy decoder. For example, the start addresses of the input and output memories are programmable by software, whether or not to use zig-zag decoding, the block size, etc. Furthermore, the entropy decoder can be programmed to halt its execution at specific conditions, such as for example when the output buffer is completely filled. The entropy decoder also possesses a wrap around memory read feature, to continuously operate on incoming data with limited memory size, and provides a status interface for hardware pooling.

In order to synchronize the incoming flux of packets, the decoding of such packets and the consequently forwarding of decoded data to post-processing modules, a state machine is used. At first, the decoder is in an idle state, waiting for the arrival of packets. Triggered by the HSI, the decoder consumes one of the input memories blocks designated by the previous hardware unit. The entropy decoder must first check for available resources before start executing, that is, it needs to check if the output memories are available. In case they are, the hardware unit starts executing the packet decoding. The unit can halt in case all the input was consumed, or a pre-defined condition is met (for example, the output memory is full). Once the decoding procedure is done, the entropy decoder must assign the decoded data to the subsequent hardware. For example, if the texture of a seed was decoded, the next module to assume the decoded packet would be the inverse image transform module, which would execute the dequantization and inverse image transform step of the decoding processing chain. Therefore, the entropy decoder needs to query for the status of the HW modules, and in case they are not busy and can receive the decoder packets, the module would be configured and the decoder can release the allocated resources, that is, transfer the ownership of the memory module from the entropy decoder to the next hardware module in line. The entropy decoder then returns to the idle state and waits for another packet from the HSI interface.

Hogel Content Repetition—

Depending on the type of data decoded by the entropy decoder stage, subsequent operations are performed. For example, if the disparity of a seed hogel is sent, the entropy decoder decodes a sequence of run-length values, which still need to be expanded to obtain the original image. The Hogel Content Repetition module for seed disparity reads one data entry from the coefficient memory and one increment entry. Then it generates the increment times the data entry and streams it out to another memory module. This means that the module repeats the data it read as many times as it is specified through the increment value. The seed disparity, as explained previously, is processed by the Hogel Content Repetition module 1920, which reads out the disparity values from the coefficient memory 1963 and the incremental values from the Minc memory 1962. The result is stored in the disparity memory 1964. For the residual disparity, another Hogel Content Repetition module 1920 is used. In this case, the increment indicates the jump in memory position where the block is copied, and similar to the seed disparity, both coefficient and Minc memory modules are read, and the disparity memory is written. Notice that the locations for seed and residual disparity should be in different modules, such that they can be accessed at the same time, since the seed disparity is reused several times by the forward DIBR 1925 module, while the residual disparity is used only once. An additional RGB mode that skips the image transform can also be used, and is processed by the remaining Hogel Content Repetition module 1920. In this case, an RGB value is decoded and the increment indicates how many times that value needs to be repeated in the output memory, a texture memory 1966. The Hogel Content Repetition modules are a versatile memory transfer utility for copying data between internal buffers having different sizes (different lengths and different data widths) without multiplicative scaling.

The state machine of all three modules is similar. At first the hardware units are idle, waiting for a new packet to process. They are then triggered by the entropy decoder, who decides the hardware to activate according to the type of data to be handled. The hardware then moves to the state where it needs to wait for resources, such as the memory from which it needs to read the packets to be handed off by the entropy decoder, or the output memory to become available. With all the resources needed, the hardware moves to the execute state. It stays in this state until it finishes consuming all the input, when it then goes to the final state, where the unit needs to clear the input memory. This is required since the entropy decoder does not necessarily write in all memory positions, especially when decoding residual information, where memory jumps are required.

Nevertheless, the empty positions still need to be zeroed before being used again, so the hardware that consumed this memory is also responsible for clearing it. After the clear command finishes executing, the memory is released back to the entropy decoder, and the hardware goes back to the idle state, where it waits for another packet.

Inverse Image Transform—

The inverse image transform module 1915 is used after the entropy decoder for seed and residual texture decoding, where an image transform and dequantization is applied to the image blockwise. In one possible embodiment of this invention, the image transform can be an inverse DCT transform, or an inverse integer transform. The image transform matrix is predefined by the software and stored in an array of registers. This allows having the inverse image transform instruction work very fast as a pipelined SIMD (single instruction, multiple data) instruction. The result of the inverse image transform operation is stored into the texture memory 1966 in a linear order and not in the matrix order. The matrix calculations are performed on N×N pixels read out from the coefficients memory 1963, where the pixels are stored in memory consecutively. The desired output must be stored at the correct place in the memory. For example, the first block of the upper left corner of the hogel, in the case of N=4 and the hogel width=100, has to be stored in the following output memory address locations: (0,1,2,3; 100,101,102,103; 200,201,202,203; 300,301,302,303). If the resulting hogel size in x or y direction is not a multiple of N, for example, assume the hogel size is 50×50 when N=4, then the address generator suppresses the write enable and does not write over the edge of the defined area. Furthermore, in the case of residual texture decoding, the Minc indicates jumps in memory when writing the block in the output memory. In addition to the matrix multiplication a point wise multiplication with N×N dequantization parameters is incorporated into the matrix multiplier module. Each of the input coefficients are first multiplied with the corresponding dequantization parameters, which are also stored as a fixed N×N matrix in a specific register set. Two additional values scale all the inputs and all the outputs. This allows the highest level of flexibility. Therefore the complete function of this module can also be described as:

$$R=\{[S*c_0)\cdot \times D]\times M\}*c_1$$

where the matrix S is the input matrix, the matrix D is the dequantization matrix, the matrix M implements an image transform, such as but not limited to a DCT matrix, the symbol * represents scalar multiplication (term by term) which is applied on an element-by-element basis, the symbol × represents the matrix inner product, the symbol ·× represents the matrix scalar product, and $c_0$ and $c_1$ are scaling factors for the input and the output, respectively.

The state machine of the inverse image transform module works in a similar manner to the Repetition decoder modules. At first the hardware unit is idle, waiting for a new packet to process. It is triggered by the entropy decoder when texture data needs to be further processed (dequantization and inverse transform). The hardware then moves to the state where it needs to wait for resources, such as the memory from which it needs to read the packets to be handed off by the entropy decoder, or the output memory to become available. When all the resources become available, the hardware moves to the execute state. It stays in this state until it finishes consuming all the input, when it then goes to the final state, where the unit needs to clear the input memory like in the case of the Repetition decoder units. After the clear command finishes executing, the memory is released back to the entropy decoder, and the hardware goes back to the idle state, where it waits for another packet.

Forward and Backward DIBR Modules—

As soon as the seed disparity is available, the forward DIBR 1925 block can start processing the warping operation and produce the warped disparity, as required by the decoding algorithm of this invention. The warping processing results in shifts and copy operations of the reference pixel positions. The DIBR algorithm is split into a forward DIBR 1925 portion and a backward DIBR 1930 portion. The forward DIBR 1925 hardware reads the disparity information from the seed disparity memory 1964 and generates hogel disparity in a temporary disparity memory 1965. The forward DIBR 1925 is also capable of performing a downsampling of N->1, i.e. taking N pixels as inputs and producing one single pixel output. Nevertheless, to do that, all N pixels need to be read and analyzed leading to N read cycles per each hogel. To achieve the same throughput in the system the forward DIBR 1925 is implemented in a way that the disparity of N hogels may be generated in parallel. The input dx and dy designate the distance of the residual hogel from the seed hogel and are used as input of the algorithm to estimate the shift amount. Based on the disparity information and the distance of the seed hogel to the residual hogel the copy and shift information is calculated. Next the data needs to be checked if it should be written into the destination address. Since shifts can result into two pixels moving to the same location, the decision on which pixel should prevail is decided according to the pixels disparity value. This is also known as the z-test. The input and output memory positions are also programmable, in order to use a ping-pong scheme with multiple memory banks, and allow the backward DIBR 1930 to work simultaneously with the forward DIBR 1925.

The forward DIBR 1925 module maintains an idle state while there are no hogels in the system or all the hogels were processed. In one embodiment of this invention, a table containing metadata information is sent before the data packets. Once this table is received, a local metadata table is constructed in the firmware memory, so that the status of each hogel can be monitored globally. As soon as the metadata table is created (usually triggered by the HSI interface, which receives the header packets containing this information), the hardware moves to the state where it checks the flags of the top hogel of the list. The flags indicate the stage where the hogel is passing through (for example, dequantizing the texture at the inverse image transform block or expanding the disparity at the repetition decoder module). The forward DIBR 1925 module checks for the seed hogel disparity. Once the entire data is available, the module takes ownership of the memory module containing the seed's disparity and starts performing forward DIBR 1925. Notice that the metadata table contains information necessary for the warping operation, such as the coordinates of the seed hogel and the target hogel. Moreover, multiple results are generated simultaneously, to preserve the real-time feature of the apparatus. Once the hardware finishes execution, the metadata flags are updated, and the unit either proceeds to generate the warped disparity of the next set of hogels, or just goes back to the idle state and waits for a new set of hogels.

The backward DIBR 1930 reads the generated temporary disparity from the forward DIBR 1925 and stored in the temporary disparity memory bank 1965 and calculates the current hogel address reference position in the seed hogel texture, stored in the seed hogel texture memory 1966. After reading the reference texture from the seed hogel texture memory 1966, the backward DIBR 1930 module stores the RGB values in the appropriate output memory positions 1967. The Backward DIBR 1930 generated hogels may not perfectly represent the view they are supposed to represent. This means that potential errors may be generated. There are two causes of errors in terms of the backward DIBR 1930 algorithm. The first one is that the disparity generated through the forward DIBR 1925 may not be the best choice for a particular pixel. In addition to that, for some results in the hogel there may not be a texture defined or the texture is corrupted, that is, either the warped hogel has holes or the texture is view dependent and the reference texture used is not appropriate for that particular hogel. In order to fix the disparity error, the backward DIBR 1930 utilizes the residual disparity. The residual disparity is stored in the disparity memory 1964, and is read and combined with the disparity generated by the forward DIBR 1925. The programmable mode of operation of the backward DIBR 1930 allows for either replacing the disparity or adding the two disparities together. The new disparity value is capable of referencing a different seed hogel texture value, and improves the final rendering quality. The backward DIBR 1930 algorithm is also capable of filling the pixel positions not referenced by the warping operation with a fixed RGB value. Those positions are also known as holes, and the proposed module of one embodiment of this invention is capable of receiving a fixed RGB value in the bitstream and fill in all the holes with this fixed value.

Similar to the forward DIBR 1925 module, the behavior of the backward DIBR 1930 module is dictated by the metadata table of the hogels of the system. While there is no hogels or the module just finished processing all the hogels of the metadata list, it just stays in the state where it waits for incoming hogels. The change of state is triggered by the HSI, once the new metadata table is formed in memory. Then the hardware unit is responsible to monitor the state of each hogel in the table. Once the hogels achieve the condition where the backward DIBR 1930 processes them, the hardware unit goes to the execute state, where the hogel texture is created from the seed disparity, the residual disparity and the seed texture. When the hardware is done, changes to the next state where it clears the input memory and release the output resources for the next module. The resources are released and the metadata status of the hogel it just worked on is updated. The hardware monitors the status of the next hogel in the metadata table, and in case all the N hogels were processed, the backward DIBR 1930 goes back to the idle state and waits for new incoming data.

Error Correction—

As mentioned previously, the texture result from the backward DIBR 1930 might still contain erroneous or missing values. Since not all the pixel positions may be covered by the warping operation (usually represented in the form of holes), they might have no texture value, also known as holes, or might be assigned to a wrong RGB value during the backward DIBR 1930 hole filling. Moreover, features that are view-dependent have different RGB values between views, so the reference used in the warping operation may be different from the real RGB value. In order to correct these artifacts, residual texture information is sent and added to the backward DIBR 1930 result in the error correction module. FIG. 19 depicts the error correction 1935 module, along with the input memories for the residual texture 1966 and the DIBR texture 1967, the warped seed texture that is added to the residual texture. The result is the final hogel value stored in the hogel memory block 1968. In one possible embodiment of this invention, the error correction module utilizes 24-bit words that contain in fact three 8-bit words. The error correction hardware module needs to take that into account and separate the three values before adding them individually and then putting them together as one 24 bit word. The difference information is given as a signed number whereas the result and the original hogel information are given as a unsigned 8-bit value. For example, an unsigned 8 bit word is generated from an unsigned 8 bit word added to a signed 8-bit word. Nevertheless, the addition function shall not wrap around but clip at the maximum or minimum value (i.e. 0 or 255). Additionally to the error correction functionality, this hardware module allows for color conversion and also color parameter adjustments (such as gamma correction and brightness adjustment). The color correction and the color space transform are directly performed on the output of the Error Correction module. A color conversion matrix is integrated into the Error Correction module, and it can be freely programmed and also switched off as needed. The output is scaled by an additional scaler, which is the same for all three color channels.

Similar to the forward 1925 and backward DIBR 1930 modules, the error correcting 1935 module first starts in an idle state and monitors the metadata table, waiting for the hogels to reach the appropriate state. While there are no hogels or the module just finished processing all the hogels of the metadata list, it just stays in the state where it waits for incoming hogels. The change of state is triggered by the HSI, once the new metadata table is formed in memory. Once the hogels achieve the condition where the error correcting module processes them, the hardware unit goes to the execute state, where the hogel texture is added to the residual texture. When the hardware is done, it changes to the next state where it clears the input memory and releases the output resources for the next module. Once the resources are released, the hogel metadata information is updated in the metadata table to identify that this processing stage is done. The hardware monitors the status of the next hogel in the metadata table, and in case all the N hogels were processed, the error correcting 1935 module goes back to the idle state and waits for new incoming data.

Interleaver—

The error corrected hogels are then transposed through an interleaver function to separate out the individual bits per each hogel. In one possible embodiment of this invention, the interleaver allows translating a 50×50 pixel array with 24-bits into 24×50 words of 50 bits each. Each 50 bit word now represents one bit out of the 24 bit for 50 pixels. FIG. 19 shows the interleaver 1940 module, with the associated input memory module 1968 that is the final hogel texture produced by the error correction module, and the output memory module 1969, which holds the RGB bitplanes. The data comes in from a 24 bit wide hogel memory structure. The interleaver 1940 instruction performs the following operation separating the 24 bits into R, G and B bitplanes represented by independent memories. The output of the interleaver 1940 is a 150 bit wide bus, which allows reading R, G and B portions in parallel. Therefore the memories holding the output are 3×50 bit X (total number of hogels) word memories.

The interleaver 1940 also relies on the metadata table to operate on the incoming hogels. While there are no hogels or the module just finished processing all the hogels of the metadata list, it just stays in the state where it waits for incoming hogels. The change of state is triggered by the HSI, once the new metadata table is formed in memory. Then the hardware unit is responsible to monitor the state of each hogel in the table. Once the hogels achieve the condition where the interleaver module processes them, the hardware unit goes to the execute state, where the final hogel texture is interleaved for modulation. When the hardware is done, it changes to the next state where it releases the output resources for the next module. Once the resources are released, the hogel metadata information is updated in the metadata table to identify that this processing stage is done. The hardware monitors the status of the next hogel in the metadata table, and in case all the N hogels were processed, the error correcting module goes back to the idle state and waits for new incoming data.

Pixel Modulator—

The final step is to use the generated bits for the pixel modulator, which provide a pixel modulator output compatible with whatever the pixel input requirements are of the light field display being used. If pulse width modulation is used in a preferred embodiment, the generated bits are used as a PWM modulation mask. The mask switches on individual pixels as long as the PWM counter is running. Combining multiple bitplanes with appropriate on-times translates to the brightness of the pixel. The architecture provided in FIG. 19 shows the pixel modulator 1945 and the associated memory modules. For the output memory, the following scheme is used. From the bitplane memory a copy function selects the bitplane which is to be displayed next and stores it into the Bitplane1 latches. A controller then transfers the bitplane1 latch to the bitplane2 latch, which is an instantaneous event. After the data is in the Bitplane2 latch, it can be AND gated with the actual PWM signal, which represents the on-time. Having two Bitplane latches associated with each pixel allows loading the second bitplane while the first is still being displayed.

The final hardware module of the digital circuit, the pixel modulator 1945, also operates similar to the previous hardware, in the sense that the metadata table is used for monitoring when the hogel data is ready for its processing stage. The pixel modulator 1945 module first starts in an idle state. While there are no hogels or the module just finished processing all the hogels of the metadata list, it just stays in the state where it waits for incoming hogels. The change of state is triggered by the HSI, once the new metadata table is formed in memory. Then the hardware unit is responsible to monitor the state of each hogel in the table. Once the hogels achieve the condition where the pixel modulator 1945 module processes them, the hardware unit goes to the execute state, where the bitplanes are modulated by the pixel modulator 1945. When the hardware is done, it releases the resources and the hogel metadata information is updated in the metadata table to identify that this processing stage is done. The hardware monitors the status of the next hogel in the metadata table, and in case all the N hogels were processed, the error correcting module goes back to the idle state and waits for new incoming data. The pixel modulator may be, by way of example only, a pulse width modulator, though other modulators may instead be used as appropriate for the specific light field display used.

Those skilled in the art will readily appreciate that various modifications and changes can be applied to the embodiments of the invention without departing from its scope defined in and by the appended claims. It should be appreciated that the foregoing examples of the invention are illustrative only, and that the invention can be embodied in other specific forms without departing from the spirit or essential characteristics thereof. The disclosed embodiments, therefore, should not be considered to be restrictive in any sense. The scope of the invention is indicated by the appended claims, rather than the preceding description, and all variations which fall within the meaning and range of equivalents thereof are intended to be embraced therein.

What is claimed is:

1. A system for reproducing a light field for display from a compressed light field, the system comprising:
   at least one processing node having a plurality of hardware modules configured for decompressing the compressed light field and reproducing the light field for a display;
   each processing node having:
      a data decoder, and
      a plurality of depth-image-based rendering (DIBR) modules;
   each processing node having a bus interconnect for interconnecting the modules and a plurality of memories; and
   a sequence controller for controlling a sequence of operation of the modules to decompress compressed light field data to reproduce the light field for display.

2. The system of claim 1, wherein at least one of the modules is an application specific integrated circuit.

3. The system of claim 2 wherein at least one of the modules is programmable.

4. The system of claim 1, wherein each processing node also has an interface module configured to receive data packets and deliver the data packets to the data decoder.

5. The system of claim 4, wherein the data decoder is configured to receive data packets from the interface module, and for each data packet, if a packet header of the data packet indicates that the data packet needs to be decoded, the data decoder is further configured to decode the data packet in accordance with a packet type.

6. The system of claim 1, wherein each processing module also has an inverse image transform module configured to receive from the data decoder for blockwise seed and residual texture decoding and dequantization.

7. The system of claim 6 wherein the inverse image transform module uses a predefined image transform matrix, thereby allowing an inverse transform instruction to serve as a pipelined single instruction, multiple data instruction.

8. The system of claim 1, wherein each processing module also has a hogel content repetition module configured to copy data between internal buffers having different lengths and different data widths without multiplicative scaling.

9. The system of claim 1, wherein the plurality of DIBR modules comprises a forward DIBR module configured to receive seed hogel disparity and produce warped disparity.

10. The system of claim 9, wherein the plurality of DIBR modules comprises a backward DIBR module configured to read a generated temporary disparity from the forward DIBR module and calculate a current hogel address reference position in a seed hogel texture and generate hogels.

11. The system of claim 10, wherein the backward DIBR module is configured to also use residual disparity to combine with the seed hogel disparity to fix disparity errors.

12. The system of claim 1, wherein the plurality of DIBR modules comprises a backward DIBR module configured to fill pixel positions not referenced by a warping operation.

13. The system of claim 1, wherein each processing node also has an error correction module configured to correct artifacts.

14. The system of claim 13, wherein the error correction module is also configured to perform color correction and color space transform on an output of the error correction module.

15. The system of claim 1, wherein each processing node also has an interleaver module configured to transpose error corrected hogels to separate out individual bits per each hogel.

16. The system of claim 1, wherein each processing node also has a pixel modulator configured to provide a pixel modulator output compatible with pixel input requirements of a light field display being used to display the reproduced light field.

17. A method for reproducing a light field for display from a compressed light field, the method comprising:
receiving, by a data decoder, data packets;
for each data packet,
determining, by the data decoder, whether a packet header of the data packet indicates that the data packet needs to be decoded, and
in response to determining that the packet header of the data packet indicates that the data packet needs to be decoded, decoding, by the data decoder, the data packet in accordance with a packet type; and
receiving, by an inverse image transform module, from the data decoder for blockwise seed and residual texture decoding and dequantization.

18. The method of claim 17, further comprising using, by the inverse image transform module, a predefined image transform matrix, thereby allowing an inverse transform instruction to serve as a pipelined single instruction, multiple data instruction.

19. The method of claim 17, further comprising receiving, by an interface module, the data packets and delivering the data packets to the data decoder.

20. The method of claim 17, further comprising copying, by a hogel content repetition module, data between internal buffers having different lengths and different data widths without multiplicative scaling.

21. The method of claim 17, further comprising receiving, by a forward depth-image-based rendering (DIBR) module, seed hogel disparity and producing warped disparity.

22. The method of claim 21, further comprising reading, by a backward DIBR module, a generated temporary disparity from the forward DIBR module and calculating a current hogel address reference position in a seed hogel texture and generating hogels.

23. The method of claim 22, further comprising using, by the backward DIBR module, residual disparity to combine with the seed hogel disparity to fix disparity errors.

24. The method of claim 17, further comprising filling, by a backward depth-image-based rendering (DIBR) module, pixel positions not referenced by a warping operation.

25. The method of claim 17, further comprising correcting by an error correction module artifacts.

26. The method of claim 25, further comprising performing by the error correction module color correction and color space transform on an output of the error correction module.

27. The method of claim 17, further comprising transposing by an interleaver module error corrected hogels to separate out individual bits per each hogel.

28. The method of claim 17, further comprising providing by a pixel modulator a pixel modulator output compatible with pixel input requirements of a light field display being used to display the reproduced light field.

* * * * *